United States Patent
Kumar et al.

(10) Patent No.: US 9,233,696 B2
(45) Date of Patent: Jan. 12, 2016

(54) TRIP OPTIMIZER METHOD, SYSTEM AND COMPUTER SOFTWARE CODE FOR OPERATING A RAILROAD TRAIN TO MINIMIZE WHEEL AND TRACK WEAR

(75) Inventors: Ajith Kuttannair Kumar, Erie, PA (US); Wolfgang Daum, Erie, PA (US); Glenn Robert Shaffer, Erie, PA (US); Paul Kenneth Houpt, Schenectady, NY (US); Joseph Forrest Noffsinger, Lees Summit, MO (US); David Lowell McKay, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 1341 days.

(21) Appl. No.: 12/573,141

(22) Filed: Oct. 4, 2009

(65) Prior Publication Data

US 2010/0023190 A1    Jan. 28, 2010

Related U.S. Application Data

(63) Continuation-in-part of application No. 11/385,354, filed on Mar. 20, 2006.

(51) Int. Cl.
 *G05D 3/00*   (2006.01)
 *G06F 17/00*  (2006.01)
 (Continued)

(52) U.S. Cl.
 CPC .............. *B61L 3/006* (2013.01); *B61L 23/042* (2013.01); *B61L 25/025* (2013.01); *B61L 25/026* (2013.01);
 (Continued)

(58) Field of Classification Search
 CPC . B61L 3/006; B61L 27/0027; B61L 2205/05; B61L 17/00; B61L 25/025; B61L 27/0088; B61L 23/042; B61L 25/026; B61L 2205/04; G05B 13/021
 USPC ....................................... 701/19, 20; 246/170
 See application file for complete search history.

(56) References Cited

U.S. PATENT DOCUMENTS 2,104,652 A    1/1938   Inman
2,601,634 A    6/1952   Rivette
(Continued)

FOREIGN PATENT DOCUMENTS

CH    642 418        4/1984
DE    197 26 542    11/1998
(Continued)

OTHER PUBLICATIONS

Razouqi et al. RYNSORD: A Novel, Decentralized Algorithm for Railway Networks with 'Soft Reservation', VTC, 1998, pp. 1585-2589, V3, New York, NY.
(Continued)

*Primary Examiner* — Redhwan k Mawari
*Assistant Examiner* — Rodney P King
(74) *Attorney, Agent, or Firm* — GE Global Patent Operation; John A. Kramer

(57) ABSTRACT

A system for controlling a railroad train over a segment of track. The system comprises a first element for determining a location of the train on the segment of track; a second element for providing track characterization information for the segment of track; the track characterization information related to physical conditions of the segment of track; and a processor for controlling applied tractive forces and braking forces of the train responsive to the location of the train and the track characterization information to reduce at least one of wheel wear and/or track wear during operation of the train over the segment of track.

32 Claims, 12 Drawing Sheets

(51) Int. Cl.
*B61L 3/00* (2006.01)
*B61L 23/04* (2006.01)
*B61L 25/02* (2006.01)
*B61L 27/00* (2006.01)
*G05B 13/02* (2006.01)

(52) U.S. Cl.
CPC ......... *B61L 27/0027* (2013.01); *B61L 27/0077* (2013.01); *B61L 27/0088* (2013.01); *G05B 13/021* (2013.01); *B61L 2205/04* (2013.01)

(56) References Cited

U.S. PATENT DOCUMENTS

| | | | |
|---|---|---|---|
| 2,927,711 A | 3/1960 | Naggiar | |
| 3,519,805 A | 7/1970 | Thorne-Booth | |
| 3,650,216 A | 3/1972 | Harwick et al. | |
| 3,655,962 A | 4/1972 | Koch | |
| 3,718,040 A * | 2/1973 | Freeman et al. | ................ 73/146 |
| 3,781,139 A | 12/1973 | Lohse | |
| 3,794,833 A | 2/1974 | Blazek et al. | |
| 3,865,042 A | 2/1975 | DePaola et al. | |
| 3,886,870 A | 6/1975 | Pelabon | |
| 3,948,314 A | 4/1976 | Creswick et al. | |
| 4,005,838 A | 2/1977 | Grundy | |
| 4,041,283 A | 8/1977 | Mosier | |
| 4,042,810 A | 8/1977 | Mosher | |
| 4,136,432 A | 1/1979 | Melley, Jr. | |
| 4,181,943 A | 1/1980 | Mercer et al. | |
| 4,253,399 A | 3/1981 | Spigarelli | |
| 4,279,395 A | 7/1981 | Boggio | |
| 4,344,364 A | 8/1982 | Nickles et al. | |
| 4,355,582 A * | 10/1982 | Germer | ........................ 105/164 |
| 4,401,035 A | 8/1983 | Spigarelli et al. | |
| 4,548,164 A | 10/1985 | Ylonen et al. | |
| 4,561,057 A | 12/1985 | Haley et al. | |
| 4,602,335 A | 7/1986 | Perlmutter | |
| 4,617,627 A | 10/1986 | Yasunobu et al. | |
| 4,644,705 A | 2/1987 | Saccomani et al. | |
| 4,663,713 A | 5/1987 | Cornell et al. | |
| 4,711,418 A | 12/1987 | Aver et al. | |
| 4,735,385 A | 4/1988 | Nickles et al. | |
| 4,794,548 A | 12/1988 | Lynch et al. | |
| 4,827,438 A | 5/1989 | Nickles et al. | |
| 4,843,575 A | 6/1989 | Crane | |
| 4,853,883 A | 8/1989 | Nickles et al. | |
| 5,109,343 A | 4/1992 | Budway | |
| 5,181,541 A | 1/1993 | Bodenheimer | |
| 5,187,945 A | 2/1993 | Dixon | |
| 5,197,627 A | 3/1993 | Disabato et al. | |
| 5,239,472 A | 8/1993 | Long et al. | |
| 5,240,416 A | 8/1993 | Bennington | |
| 5,253,153 A | 10/1993 | Mathews et al. | |
| 5,316,174 A | 5/1994 | Schutz | |
| 5,363,787 A | 11/1994 | Konopasek et al. | |
| 5,388,034 A | 2/1995 | Allen et al. | |
| 5,398,894 A | 3/1995 | Pascoe | |
| 5,437,422 A | 8/1995 | Newman | |
| 5,440,489 A | 8/1995 | Newman | |
| 5,460,013 A | 10/1995 | Thomsen | |
| 5,487,516 A | 1/1996 | Murata et al. | |
| 5,623,413 A | 4/1997 | Matheson et al. | |
| 5,642,827 A | 7/1997 | Madsen | |
| 5,651,330 A | 7/1997 | Jewett | |
| 5,676,059 A | 10/1997 | Alt | |
| 5,720,455 A | 2/1998 | Kull et al. | |
| 5,738,311 A | 4/1998 | Fernandez | |
| 5,740,547 A | 4/1998 | Kull et al. | |
| 5,744,707 A | 4/1998 | Kull | |
| 5,755,349 A | 5/1998 | Brundle | |
| 5,758,299 A | 5/1998 | Sandborg et al. | |
| 5,785,392 A | 7/1998 | Hart | |
| 5,794,172 A | 8/1998 | Matheson et al. | |
| 5,803,411 A | 9/1998 | Ackerman et al. | |
| 5,813,635 A | 9/1998 | Fernandez | |
| 5,820,226 A | 10/1998 | Hart | |
| 5,828,979 A | 10/1998 | Polivka et al. | |
| 5,833,325 A | 11/1998 | Hart | |
| 5,927,822 A | 7/1999 | Hart | |
| 5,934,764 A | 8/1999 | Dimsa et al. | |
| 5,950,967 A | 9/1999 | Montgomery | |
| 5,957,571 A | 9/1999 | Koster et al. | |
| 5,969,643 A | 10/1999 | Curtis | |
| 5,978,718 A | 11/1999 | Kull | |
| 5,986,577 A | 11/1999 | Bezos | |
| 5,986,579 A | 11/1999 | Halvorson | |
| 5,995,881 A | 11/1999 | Kull | |
| 5,998,915 A | 12/1999 | Scholz et al. | |
| 6,092,021 A | 7/2000 | Ehlbeck et al. | |
| 6,112,142 A | 8/2000 | Shockley et al. | |
| 6,114,974 A | 9/2000 | Halvorson | |
| 6,123,111 A | 9/2000 | Nathan et al. | |
| 6,125,311 A | 9/2000 | Lo | |
| 6,128,558 A | 10/2000 | Kernwein | |
| 6,129,025 A | 10/2000 | Minakami et al. | |
| 6,135,396 A * | 10/2000 | Whitfield et al. | ......... 246/182 R |
| 6,144,901 A | 11/2000 | Nickles et al. | |
| 6,163,089 A | 12/2000 | Kull | |
| 6,198,993 B1 | 3/2001 | Higashi et al. | |
| 6,216,095 B1 | 4/2001 | Glista | |
| 6,216,957 B1 | 4/2001 | Turunen, Jr. | |
| 6,230,668 B1 | 5/2001 | Marsh et al. | |
| 6,243,694 B1 | 6/2001 | Bonissone et al. | |
| 6,263,266 B1 | 7/2001 | Hawthorne | |
| 6,269,034 B1 | 7/2001 | Shibuya | |
| 6,270,040 B1 | 8/2001 | Katzer | |
| 6,275,165 B1 | 8/2001 | Bezos | |
| 6,308,117 B1 | 10/2001 | Ryland et al. | |
| 6,322,025 B1 | 11/2001 | Colbert et al. | |
| 6,325,050 B1 | 12/2001 | Gallagher et al. | |
| 6,332,106 B1 | 12/2001 | Hawthorne et al. | |
| 6,360,998 B1 | 3/2002 | Halvorson et al. | |
| 6,363,331 B1 | 3/2002 | Kyrtsos | |
| 6,377,215 B1 | 4/2002 | Halvorson et al. | |
| 6,380,639 B1 | 4/2002 | Soucy | |
| 6,404,129 B1 | 6/2002 | Hendricx et al. | |
| 6,434,452 B1 | 8/2002 | Gray | |
| 6,459,964 B1 | 10/2002 | Vu et al. | |
| 6,487,488 B1 | 11/2002 | Peterson et al. | |
| 6,505,103 B1 | 1/2003 | Howell et al. | |
| 6,516,727 B2 | 2/2003 | Kraft | |
| 6,520,124 B2 | 2/2003 | Bohm, II | |
| 6,549,803 B1 | 4/2003 | Raghavan et al. | |
| 6,591,758 B2 | 7/2003 | Kumar | |
| 6,609,049 B1 | 8/2003 | Kane et al. | |
| 6,612,245 B2 | 9/2003 | Kumar et al. | |
| 6,612,246 B2 | 9/2003 | Kumar | |
| 6,615,118 B2 | 9/2003 | Kumar | |
| 6,647,328 B2 | 11/2003 | Walker | |
| 6,676,089 B1 | 1/2004 | Katzer | |
| 6,694,231 B1 | 2/2004 | Rezk | |
| 6,698,913 B2 | 3/2004 | Yamamoto | |
| 6,702,235 B2 | 3/2004 | Katzer | |
| 6,732,023 B2 | 5/2004 | Sugita et al. | |
| 6,763,291 B1 | 7/2004 | Houpt et al. | |
| 6,782,044 B1 | 8/2004 | Wright et al. | |
| 6,789,005 B2 | 9/2004 | Hawthorne | |
| 6,810,312 B2 | 10/2004 | Jammu et al. | |
| 6,824,110 B2 | 11/2004 | Kane et al. | |
| 6,845,953 B2 | 1/2005 | Kane et al. | |
| 6,856,865 B2 | 2/2005 | Hawthorne | |
| 6,863,246 B2 | 3/2005 | Kane et al. | |
| 6,865,454 B2 | 3/2005 | Kane et al. | |
| 6,873,888 B2 | 3/2005 | Kumar | |
| 6,903,658 B2 | 6/2005 | Kane et al. | |
| 6,910,792 B2 | 6/2005 | Takada et al. | |
| 6,915,191 B2 | 7/2005 | Kane et al. | |
| 6,922,619 B2 | 7/2005 | Baig et al. | |
| 6,948,837 B2 | 9/2005 | Suzuki | |
| 6,953,272 B2 | 10/2005 | Hayakawa et al. | |
| 6,957,131 B2 | 10/2005 | Kane et al. | |
| 6,973,947 B2 | 12/2005 | Penaloza et al. | |
| 6,978,195 B2 | 12/2005 | Kane et al. | |
| 6,980,894 B1 | 12/2005 | Gordon et al. | |
| 6,996,461 B2 | 2/2006 | Kane et al. | |

(56) References Cited

U.S. PATENT DOCUMENTS

| | | | |
|---|---|---|---|
| 7,021,588 B2 | 4/2006 | Hess et al. |
| 7,021,589 B2 | 4/2006 | Hess et al. |
| 7,024,289 B2 | 4/2006 | Kane et al. |
| 7,036,774 B2 | 5/2006 | Kane et al. |
| 7,072,747 B2 | 7/2006 | Armbruster et al. |
| 7,072,757 B2 | 7/2006 | Adams et al. |
| 7,073,753 B2 | 7/2006 | Root et al. |
| 7,079,926 B2 | 7/2006 | Kane et al. |
| 7,092,800 B2 | 8/2006 | Kane et al. |
| 7,092,801 B2 | 8/2006 | Kane et al. |
| 7,092,894 B1 | 8/2006 | Crone |
| 7,096,171 B2 | 8/2006 | Hawthorne et al. |
| 7,127,336 B2 | 10/2006 | Houpt et al. |
| 7,131,403 B1 | 11/2006 | Banga et al. |
| 7,164,975 B2 | 1/2007 | Bidaud |
| 7,222,083 B2 | 5/2007 | Matheson et al. |
| 7,302,895 B2 | 12/2007 | Kumar et al. |
| 7,340,328 B2 | 3/2008 | Matheson et al. |
| 7,343,314 B2 | 3/2008 | Matheson et al. |
| 7,347,168 B2 | 3/2008 | Reckels et al. |
| 7,349,797 B2 | 3/2008 | Donnelly et al. |
| 7,416,262 B2 | 8/2008 | Ring |
| 7,497,201 B2 | 3/2009 | Hollenbeck |
| 7,500,436 B2 | 3/2009 | Kumar et al. |
| 7,509,193 B2 | 3/2009 | Kustosch |
| 7,522,990 B2 | 4/2009 | Daum et al. |
| 7,539,624 B2 | 5/2009 | Matheson et al. |
| 7,558,740 B2 | 7/2009 | Matheson et al. |
| 7,618,011 B2 | 11/2009 | Oleski et al. |
| 7,667,611 B2 | 2/2010 | Lindsey et al. |
| 8,157,218 B2 | 4/2012 | Riley et al. |
| 8,428,798 B2 | 4/2013 | Kull |
| 2001/0029411 A1 | 10/2001 | Hawthorne |
| 2001/0047241 A1 | 11/2001 | Khavakh et al. |
| 2002/0059075 A1 | 5/2002 | Schick et al. |
| 2002/0072833 A1 | 6/2002 | Gray |
| 2002/0093201 A1 | 7/2002 | Soucy |
| 2002/0096081 A1 | 7/2002 | Kraft |
| 2002/0107618 A1 | 8/2002 | Deguchi et al. |
| 2002/0174653 A1 | 11/2002 | Uzkan |
| 2003/0001050 A1 | 1/2003 | Katzer |
| 2003/0034423 A1 | 2/2003 | Hess, Jr. et al. |
| 2003/0076221 A1 | 4/2003 | Akiyama et al. |
| 2003/0091017 A1 | 5/2003 | Davenport et al. |
| 2003/0104899 A1 | 6/2003 | Keller |
| 2003/0105561 A1 | 6/2003 | Nickles et al. |
| 2003/0120400 A1 | 6/2003 | Ahmed Baig et al. |
| 2003/0183729 A1 | 10/2003 | Root et al. |
| 2003/0213875 A1 | 11/2003 | Hess et al. |
| 2003/0222981 A1 | 12/2003 | Kisak et al. |
| 2003/0229446 A1 | 12/2003 | Boscamp et al. |
| 2003/0233959 A1 | 12/2003 | Kumar |
| 2004/0010432 A1 | 1/2004 | Matheson et al. |
| 2004/0034556 A1 | 2/2004 | Matheson et al. |
| 2004/0038831 A1* | 2/2004 | Eadie ............................ 508/110 |
| 2004/0068359 A1 | 4/2004 | Neiss et al. |
| 2004/0075280 A1* | 4/2004 | Kumar et al. ..................... 291/2 |
| 2004/0093245 A1 | 5/2004 | Matheson et al. |
| 2004/0098142 A1 | 5/2004 | Warren et al. |
| 2004/0104312 A1 | 6/2004 | Hess, Jr. et al. |
| 2004/0108814 A1 | 6/2004 | Tsuda et al. |
| 2004/0111309 A1 | 6/2004 | Matheson et al. |
| 2004/0122569 A1* | 6/2004 | Bidaud ............................ 701/19 |
| 2004/0129289 A1 | 7/2004 | Hafemann |
| 2004/0133315 A1 | 7/2004 | Kumar et al. |
| 2004/0172175 A1 | 9/2004 | Julich et al. |
| 2004/0174121 A1 | 9/2004 | Tsuda et al. |
| 2004/0245410 A1 | 12/2004 | Kisak et al. |
| 2005/0007020 A1 | 1/2005 | Tsuda et al. |
| 2005/0055287 A1 | 3/2005 | Schmidtberg et al. |
| 2005/0065674 A1 | 3/2005 | Houpt et al. |
| 2005/0085961 A1 | 4/2005 | Kane et al. |
| 2005/0109882 A1 | 5/2005 | Armbruster et al. |
| 2005/0120904 A1 | 6/2005 | Kumar et al. |
| 2005/0121005 A1 | 6/2005 | Edwards |
| 2005/0121971 A1 | 6/2005 | Ring |
| 2005/0171655 A1 | 8/2005 | Flynn et al. |
| 2005/0171657 A1 | 8/2005 | Kumar |
| 2005/0188745 A1 | 9/2005 | Staphanos et al. |
| 2005/0196737 A1 | 9/2005 | Mann |
| 2005/0205719 A1 | 9/2005 | Hendrickson et al. |
| 2005/0234757 A1 | 10/2005 | Matheson et al. |
| 2005/0251299 A1 | 11/2005 | Donnelly et al. |
| 2005/0288832 A1 | 12/2005 | Smith et al. |
| 2006/0041341 A1 | 2/2006 | Kane et al. |
| 2006/0047379 A1 | 3/2006 | Schullian et al. |
| 2006/0060345 A1 | 3/2006 | Flik et al. |
| 2006/0085103 A1 | 4/2006 | Smith, Jr. et al. |
| 2006/0085363 A1 | 4/2006 | Cheng et al. |
| 2006/0116789 A1 | 6/2006 | Subramanian et al. |
| 2006/0116795 A1 | 6/2006 | Abe et al. |
| 2006/0122737 A1 | 6/2006 | Tani et al. |
| 2006/0155434 A1 | 7/2006 | Kane et al. |
| 2006/0162973 A1 | 7/2006 | Harris et al. |
| 2006/0212188 A1 | 9/2006 | Kickbusch et al. |
| 2006/0277906 A1 | 12/2006 | Burk et al. |
| 2006/0282199 A1 | 12/2006 | Daum et al. |
| 2007/0061053 A1 | 3/2007 | Zeitzew |
| 2007/0112475 A1 | 5/2007 | Koebler et al. |
| 2007/0219680 A1 | 9/2007 | Kumar et al. |
| 2007/0219681 A1 | 9/2007 | Kumar et al. |
| 2007/0219683 A1 | 9/2007 | Daum et al. |
| 2007/0233364 A1 | 10/2007 | Kumar |
| 2007/0260369 A1 | 11/2007 | Philp et al. |
| 2007/0261648 A1 | 11/2007 | Reckels et al. |
| 2008/0004721 A1 | 1/2008 | Huff et al. |
| 2008/0128563 A1 | 6/2008 | Kumar et al. |
| 2008/0147256 A1 | 6/2008 | Liberatore |
| 2008/0208393 A1 | 8/2008 | Schricker |
| 2009/0063045 A1 | 3/2009 | Figueroa et al. |
| 2009/0140574 A1 | 6/2009 | Gorman et al. |
| 2009/0177345 A1 | 7/2009 | Severinsky et al. |
| 2009/0254239 A1 | 10/2009 | Daum et al. |
| 2009/0319092 A1 | 12/2009 | Piche |
| 2010/0152998 A1 | 6/2010 | Schwarzmann |

FOREIGN PATENT DOCUMENTS

| | | |
|---|---|---|
| DE | 199 35 349 | 2/2001 |
| DE | 199 35 353 | 2/2001 |
| DE | 100 45 921 | 3/2002 |
| EP | 0 594 226 | 9/1990 |
| EP | 0 428 113 | 11/1990 |
| EP | 0 445 047 | 9/1991 |
| EP | 0 485 978 | 5/1992 |
| EP | 0 554 983 | 8/1993 |
| EP | 1 136 969 | 7/2002 |
| EP | 1 466 803 | 10/2004 |
| EP | 1 253 059 | 8/2006 |
| FR | 2 129 215 | 10/1972 |
| FR | 2 558 806 | 1/1984 |
| FR | 2 767 770 | 9/1997 |
| GB | 482 625 | 12/1936 |
| JP | 60 028153 | 2/1985 |
| JP | 50-32733 | 9/1993 |
| JP | 06-108869 | 4/1994 |
| JP | 2001-065360 | 3/2001 |
| WO | WO 95/25053 | 9/1995 |
| WO | WO 99/14093 | 3/1999 |
| WO | WO9960735 A1 | 11/1999 |
| WO | WO 03/097424 | 11/2003 |
| WO | WO 2004/023517 | 3/2004 |
| WO | WO 2004/051699 | 6/2004 |
| WO | WO 2004/051700 | 6/2004 |
| WO | WO 2004/052755 | 6/2004 |
| WO | WO 2004/059446 | 7/2004 |
| WO | WO 2005/061300 | 7/2005 |
| WO | WO 2007/027130 | 3/2007 |
| WO | WO 2007/091270 | 8/2007 |

(56) References Cited

FOREIGN PATENT DOCUMENTS

WO    WO2010039680 A1    4/2010
ZA        200101708 A    8/2001

OTHER PUBLICATIONS

ISR and WO pertaining to International application No. PCT/US2009/032933 dated Nov. 3, 2009.
Chang et al. "Cycle Detection in Repair-Based Railway Scheduling System", Robotics and Automation, 1996 pp. 2517-2522, V3, New York, NY.
Grabs, Ulrike, "Modification of Electronic Interlocking EI S in Service", Signal + Draht, Telzlaff Verlag GmbH, 1995, pp. 254-258, V87(7/08), Darmstadt, DE.
Cheng, Yu, "Hybrid Simulation for Resolving Resource conflicts in Train Traffic Rescheduling", Computers in Industry, 1998, pp. 233-246, V35(3), Amsterdam, NL.
ISR and WO pertaining to International application No. PCT US2006/032893 dated Aug. 24, 2006.
ISR and WO pertaining to International application No. PCT/US2007/001428 dated Jan. 18, 2007.
ISR and WO pertaining to International application No. PCT/US2007/066697 dated Apr. 16, 2007.
ISR and WO pertaining to International application No. PCT/US2007/076699 dated Aug. 24, 2007.
ISR and WO pertaining to International application No. PCT/US2007/078001 dated Sep. 10, 2007.
ISR and WO pertaining to International application No. PCT/US2007/078016 dated Sep. 10, 2007.
ISR and WO pertaining to International application No. PCT/US2007/078118 dated Sep. 11, 2007.
ISR and WO pertaining to International application No. PCT/US2007/078340 dated Sep. 13, 2007.
ISR and WO pertaining to International application No. PCT/US2008/063193 dated May 9, 2008.
ISR and WO pertaining to International application No. PCT/US2008/083526 dated Nov. 14, 2008.
ISR and WO pertaining to International application No. PCT/US2009/031740 dated Jan. 23, 2009.
ISR and WO pertaining to International application No. PCT/US2009/032933 dated Feb. 3, 2009.
ISR and WO pertaining to International application No. PCT/US2009/037293 dated Mar. 16, 2009.
ISR and WO pertaining to International application No. PCT/US2009/045004 dated May 22, 2009.
ISR pertaining to International application No. PCT/US2010/035058 dated May 17, 2010.
ISR pertaining to International application No. PCT/US2010/047251 dated Aug. 31, 2010.
Hooper, N.E.; Railway Track and Structures; "Reducing Rail Costs through Innovative Methods", Jul. 1993; pp. 14-17.

\* cited by examiner

TRIP OPTIMIZER METHOD, SYSTEM AND COMPUTER SOFTWARE CODE FOR OPERATING A RAILROAD TRAIN TO MINIMIZE WHEEL AND TRACK WEAR

CROSS-REFERENCE TO RELATED APPLICATIONS

This application is a Continuation-In-Part of U.S. application Ser. No. 11/385,354, filed Mar. 20, 2006, the contents of which are incorporated herein by reference in its entirety.

FIELD OF THE INVENTION

The field of invention relates to a method, system and computer software code for optimizing train operations, and more particularly to a method, system and computer software code for reducing wheel and track wear on locomotives and railcars of a railroad train.

BACKGROUND OF THE INVENTION

A locomotive is a complex system with numerous subsystems, each subsystem interdependent on other subsystems. An operator aboard a locomotive applies tractive and braking effort to control the speed of the locomotive and its load of railcars to assure safe and timely arrival at the desired destination. To perform this function and comply with prescribed operating speeds that may vary with the train's location on the track, the operator generally must have extensive experience operating the locomotive over the specified terrain with various railcar consists, i.e., different types and number of railcars.

However, even with sufficient knowledge and experience to assure safe operation, the operator generally cannot operate the locomotive to minimize fuel consumption (or other operating characteristics, e.g., emissions, wheel wear, track wear) during a trip. Multiple operating factors affect these variables, including, for example, emission limits, locomotive fuel/emissions characteristics, size and loading of railcars, track frictional forces, distribution of wheel-on-rail forces throughout the train, weather, traffic conditions, and locomotive operating parameters (which here refers to controllable elements of train operation, such as a notch number or brake applications). An operator can more effectively and efficiently operate a train (through the application of tractive and braking efforts) if provided with control information that optimizes performance during a trip while meeting a required schedule (arrival time) and using a minimal amount of fuel or optimizing another performance component such as wheel or track wear, despite the many variables that affect performance. Thus it is desired for the operator to operate the train under the guidance (or control) of a system, method or computer software code that advises the application of tractive and braking efforts to optimize one or more performance components or trip/mission objectives.

Train wheels are subject to normal wear due to friction contact between the wheel and the rail. To reduce wheel and flange wear on curves it is known to lubricate the wheel flanges prior to traversing the track curve. Notwithstanding the lubrication, the wheels tend to wear. The wheel rim width and flange width decrease while the flange height increases. It is necessary to periodically measure the rim width, the flange width and the flange height to ensure that the wheels have not worn to the point of unsafe train operation. Wheels can be recut (referred to as wheel truing) to restore the wheel profile if wheel wear causes the profile to exceed permissible tolerances related to rim width, flange width and flange height.

Measuring these wheel dimensions is difficult as the wheels are surrounded by other locomotive parts. Thus there is limited space and difficult access to the pertinent wheel features, especially the flange, which is on the inner surface of the wheel. Also, the measurements are made in poor ambient conditions, such as dim light.

Control of train speed through track curves can reduce wheel and track wear, requiring less frequent measurement of wheel dimensions and track conditions, without sacrificing train safety and comfort for train passengers. It is well known that maximum allowable forces on a curved track section can be translated to upper limits on forward speed of a locomotive, a locomotive consist and train railcars, such as freight railcars. The lateral-to-vertical force ratio (L/V) can be calculated to determine safe speeds with a low likelihood of derailment. Depending on the super-elevation of the track (lateral "tilt" toward/away from the center of curvature), there may also be a minimum speed of traversal to assure an acceptable L/V ratio.

The current technology in locomotive traction control is based on an average North American curve of approximately 2.5 degrees. In addition to reducing wear, if real-time rail data, including current track curvature and track super-elevation, is provided, the locomotive traction system can be optimized for current track conditions resulting in better train efficiency.

Track conditions can also can also have a detrimental effect on track wear. Conditions such as track warping and humping may occur. Relative and repetitive motion between the track/ties and the roadbed (e.g., ballast) due to the train loads can also, over time, cause the track rails to wear. Both wheel wear and track wear increase the likelihood of a train derailment. Controlling train operation to limit track and wheel wear improves train safety and extends the time between wheel and rail maintenance actions.

BRIEF DESCRIPTION OF THE INVENTION

Advantageously, embodiments of the invention reduce the problems associated with wheel and track wear and reduce the likelihood of derailments caused by excessive wheel wear, track wear, and wear of other train and infrastructure components.

In one embodiment, the present invention comprises a system for controlling a railroad train over a segment of track. The system comprises a first element for determining a location of the train on the segment of track, a second element for acquiring track characterization information for the segment of track, and a processor for controlling applied tractive forces and braking forces of the train responsive to the location of the train and the track characterization information to reduce at least one of wheel wear and track wear during operation of the train over the segment of track.

Examples of a first element for determining a location of the train on the segment of track include, but are not limited to: GPS (global positioning system) equipment, wayside equipment producing a location-indicating signal received by a receiver on the train, a determined time and speed from a known starting location, distance traveled from a known starting location, still picture or video-based determinations, track mileposts read by a camera or by the locomotive operator, and an RF AEI tag.

The second element referred to above comprises any element that determines track characterization information. Examples of track characterization-determining elements include, but are not limited to: wayside equipment producing a signal representing track characterization information for receiving by a receiver on the train, a video camera or a still camera mounted on the train, information loaded to a memory before the trip begins, sensors mounted on the train, observations of the train operator, and updates of an onboard memory with track characterization information obtained by a previous train that traversed the same segment of track.

Generally, the track characterization information comprises any information related to the track physical characteristics such as, but not limited to, effective track grade, actual track grade, superelevation, track elevation, location of track curves, degree of curvature, curve length, curve radius, location of track switches, degree of divergence of the two rails at a track switch, track friction and wheel friction (e.g., slippery, wet, icy, dry), track stability relative to movement of track ballast, track warping, track humping, track altitude, track age, rail type and rail hardness, allowed speed, current weather conditions, coefficient of friction between the rail and the train wheels, track damage, wheel dimensions, track dimensions, and the location of these various physical characteristics on the track segment.

Another embodiment of the invention comprises a method for operating a train over a segment of track. The method comprises determining a location of the train on the segment of track and providing track characterization information for the location or for the segment of track. The track characterization information comprises information related to a physical condition of the track. The method further comprises controlling applied tractive forces and braking forces responsive to the location of the train and the track characterization information to reduce at least one of wheel wear and track wear during operation of the train over the segment of track.

Yet another embodiment of the invention comprises a computer program product for controlling a railroad train over a segment of track, the program product being configured for execution by a processor. The program product comprises a computer readable storage medium for storing computer readable software modules. The software modules comprise a first software module for determining a location of the train on the segment of track when executed by the processor; a second software module for acquiring track characterization information for the track segment when executed by the processor (the track characterization information is information related to physical conditions of the track); and a third software module for controlling applied tractive forces and braking forces responsive to the location of the train and the track characterization information by at least one of reducing acceleration, reducing speed, and increasing deceleration, for reducing wheel wear and/or track wear, when executed by the processor.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
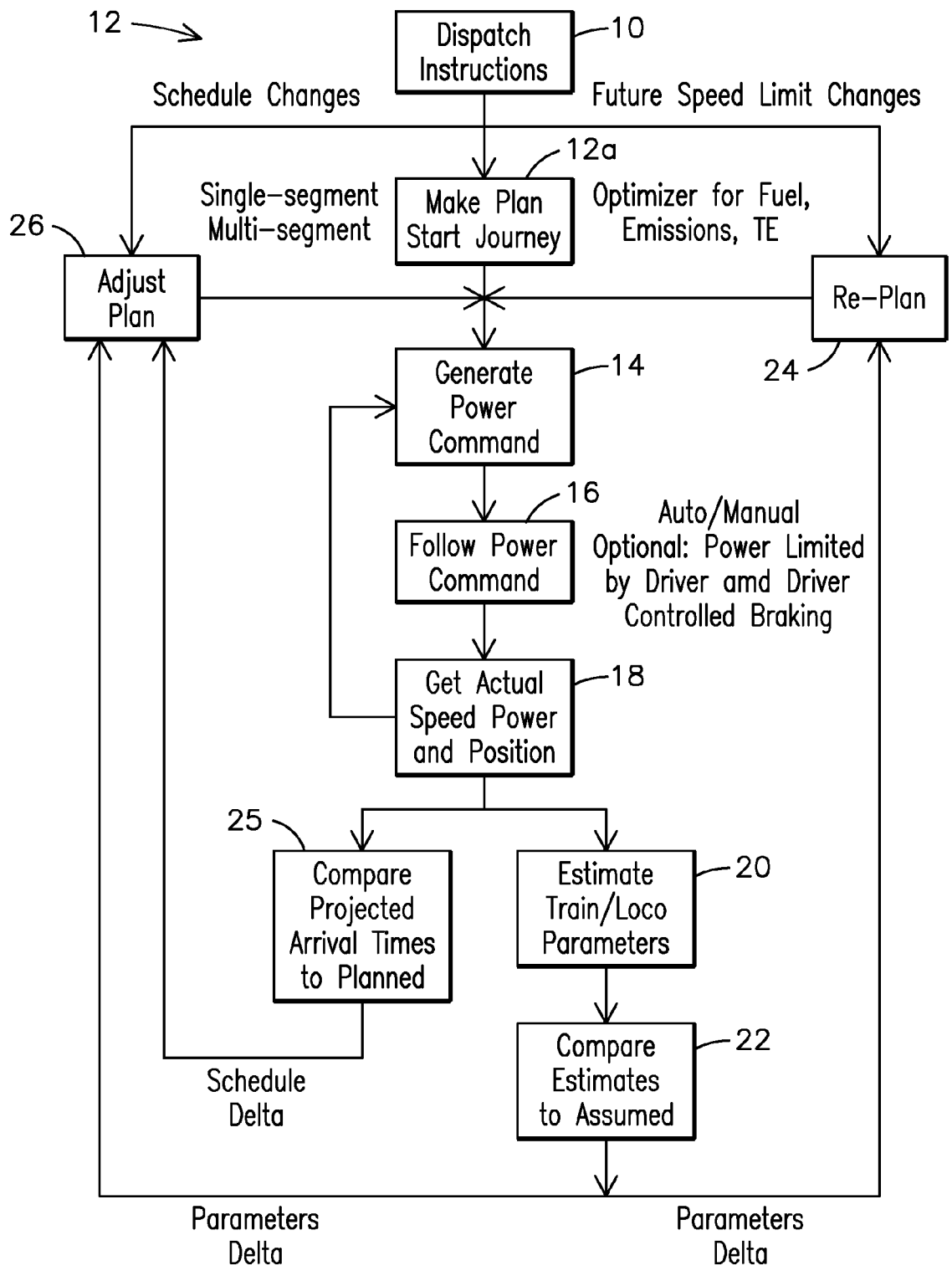
FIG. 1 is a flow chart that depicts a method for trip optimization, according to an embodiment of the present invention.

Reference will now be made in detail to the embodiments consistent with the invention, examples of which are illustrated in the accompanying drawings. Wherever possible, the same reference numerals used throughout the drawings refer to the same or like parts.

The exemplary embodiment disclosed herein of the present invention solves the problems in the art by providing a system, method, and computer implemented method for determining and implementing an operating strategy for a train having a locomotive consist (e.g., a plurality of directly connected locomotives or one or more locomotive consists distributed within the train) to monitor and control the train's operations to improve certain objective performance criteria while satisfying schedule and speed constraints. In one embodiment, the system of the present invention monitors and controls speed, acceleration, and deceleration, especially in curves and track switches, to reduce one or both of wheel wear and track wear. The likelihood of derailment and track and wheel wear can also be correlated to L/V forces so that selecting the speed to traverse specific curved track sections offers trades among speed of completing the mission, fuel used, emissions produced and wear of the costly track and wheel infrastructure components. Examples of the invention are also applicable to a distributed power train, e.g., a train having one or more locomotives or locomotive consists spaced apart from the lead locomotive and controllable by the lead locomotive operator or from a dispatch center. It is understood that the reference to a lead locomotive refers to a logical lead locomotive, i.e., the locomotive controls operation of the entire train and may be in any physical location within the train.

Persons skilled in the art will recognize that an apparatus, such as a data processing system, including a CPU, memory, a mass storage element, I/O, program storage, a connecting bus, and other appropriate components, could be programmed or otherwise designed to facilitate the practice of the method of the invention. Such a system would include appropriate programs for executing the method of the invention.

In another embodiment, an article of manufacture, such as a pre-recorded disk or other similar computer program product, for use with a data processing system, includes a storage medium and a program recorded thereon for directing the data processing system to facilitate practicing of methods of the invention. Such apparatus and articles of manufacture also fall within the spirit and scope of the invention.

Broadly speaking, the technical effect of the various embodiments of the invention comprise determining and implementing a driving strategy of a train to improve certain performance parameters or mission parameters while satisfying schedule and speed constraints. According to one embodiment, the driving strategy is intended to reduce at least one of wheel and track wear. To facilitate an understanding of examples of the present invention, it is described hereinafter with reference to specific implementations thereof.

Exemplary embodiments of the invention are described in the general context of computer-executable instructions, such as program modules, executed by a computer. Generally, program modules include routines, programs, objects, components, data structures, etc. that perform particular tasks or implement particular abstract data types. For example, the software programs that underlie exemplary examples of the invention can be coded in different languages, for use with different processing platforms and/or operating systems. In the description that follows, examples of the invention are described in the context of a web portal that employs a web browser. It will be appreciated, however, that the principles that underlie exemplary embodiments of the invention can be implemented with other types of computer software technologies as well.

Moreover, those skilled in the art will appreciate that exemplary embodiments of the invention may be practiced with other computer system configurations, including hand-held devices, multiprocessor systems, microprocessor-based or programmable consumer electronics devices, minicomputers, mainframe computers, and the like. The exemplary embodiments of the invention may also be practiced in a distributed computing environment where tasks are performed by multiple processing devices that are linked through a communications network. In the distributed computing environment, program modules may be located in both local and remote computer storage media including memory storage devices. These local and remote computing environments may be contained entirely within the locomotive, or within adjacent locomotives in a consist or off-board in wayside or central offices where wireless communications are provided between the computing environments.

The term locomotive "consist" means one or more directly-linked locomotives to provide motoring and/or braking capability with no railcars interposed between the locomotives. A train may comprise one or more locomotive consists. Specifically, there may be a lead consist and one or more remote consists, such as a first remote consist midway along the line of railcars and another remote consist at an end of train position. Each locomotive consist may have a first or lead locomotive and one or more trailing locomotives. Though a first locomotive is usually viewed as the lead locomotive, those skilled in the art will readily recognize that the first locomotive in a multi locomotive consist may be physically located in a physically trailing position. Also, even though a consist is usually considered as connected successive locomotives, those skilled in the art will readily recognize that a group of locomotives may also be recognized as a consist even with at least one railcar separating the locomotives, such as when the consist is configured for distributed power operation, wherein throttle and braking commands are relayed from the lead locomotive to the remote trails by a radio link or a physical cable. Towards this end, the term locomotive consist should be not be considered a limiting factor when discussing multiple locomotives within the same train.

Referring now to the drawings, embodiments of the present invention will be described. Exemplary embodiment of the invention can be implemented in numerous ways, including as a system (including a computer processing system), a method (including a computerized method), an apparatus, a computer readable medium, a computer program product, a graphical user interface, including a web portal, or a data structure tangibly fixed in a computer readable memory. Several embodiments of the invention are discussed below.

Embodiments of the present invention relate to a method for controlling a train, other vehicle, or other powered system, and to a trip optimizer system 12 that implements the method for controlling a train, other vehicle, or other powered system. (The system 12 is generally applicable for controlling the mission of a powered system and is not limited to controlling vehicles during trips.)

Figure 2:
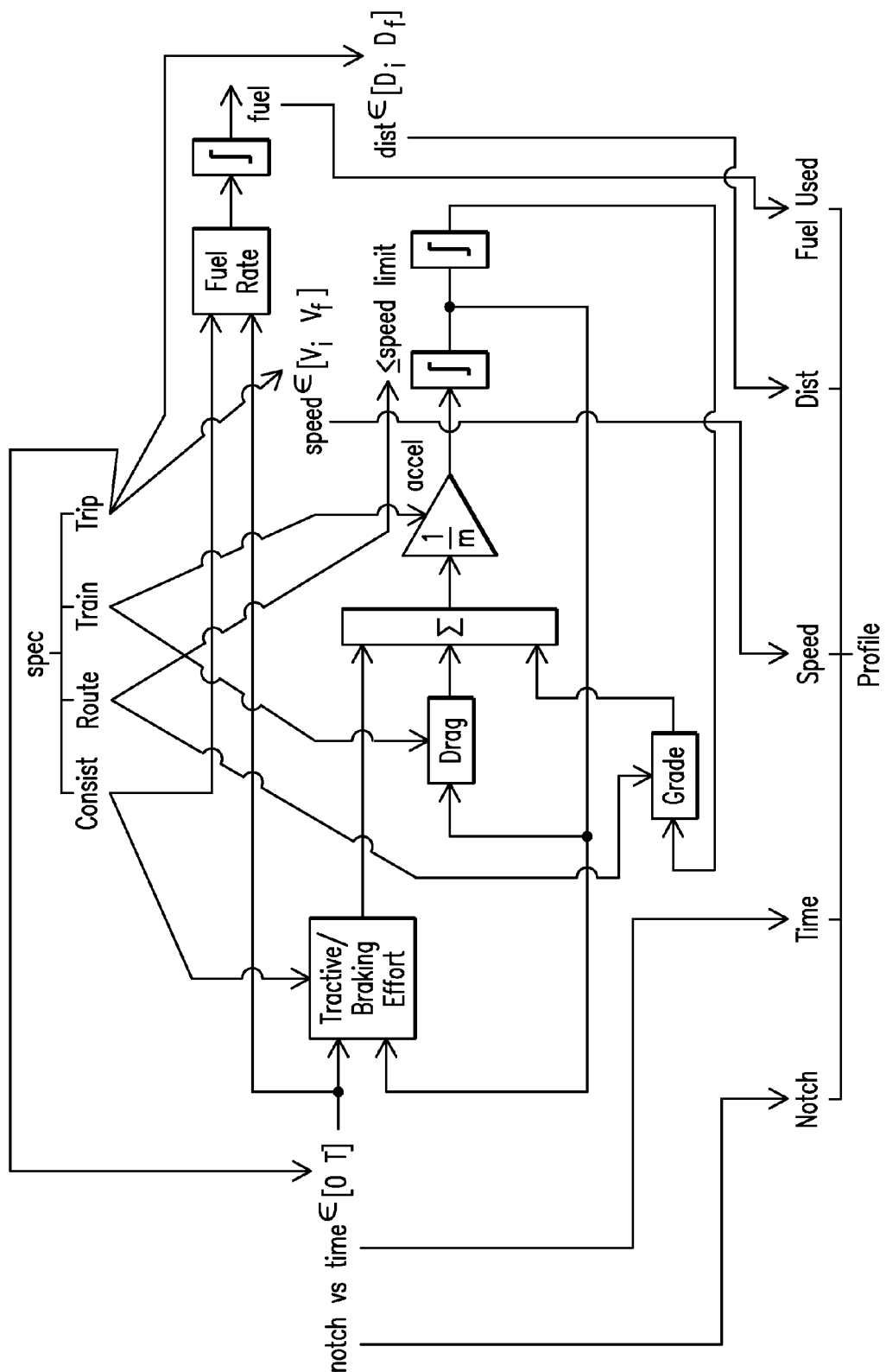
FIG. 2 depicts a simplified mathematical model of a train that may be employed in connection with the trip optimization method.
Figure 3:
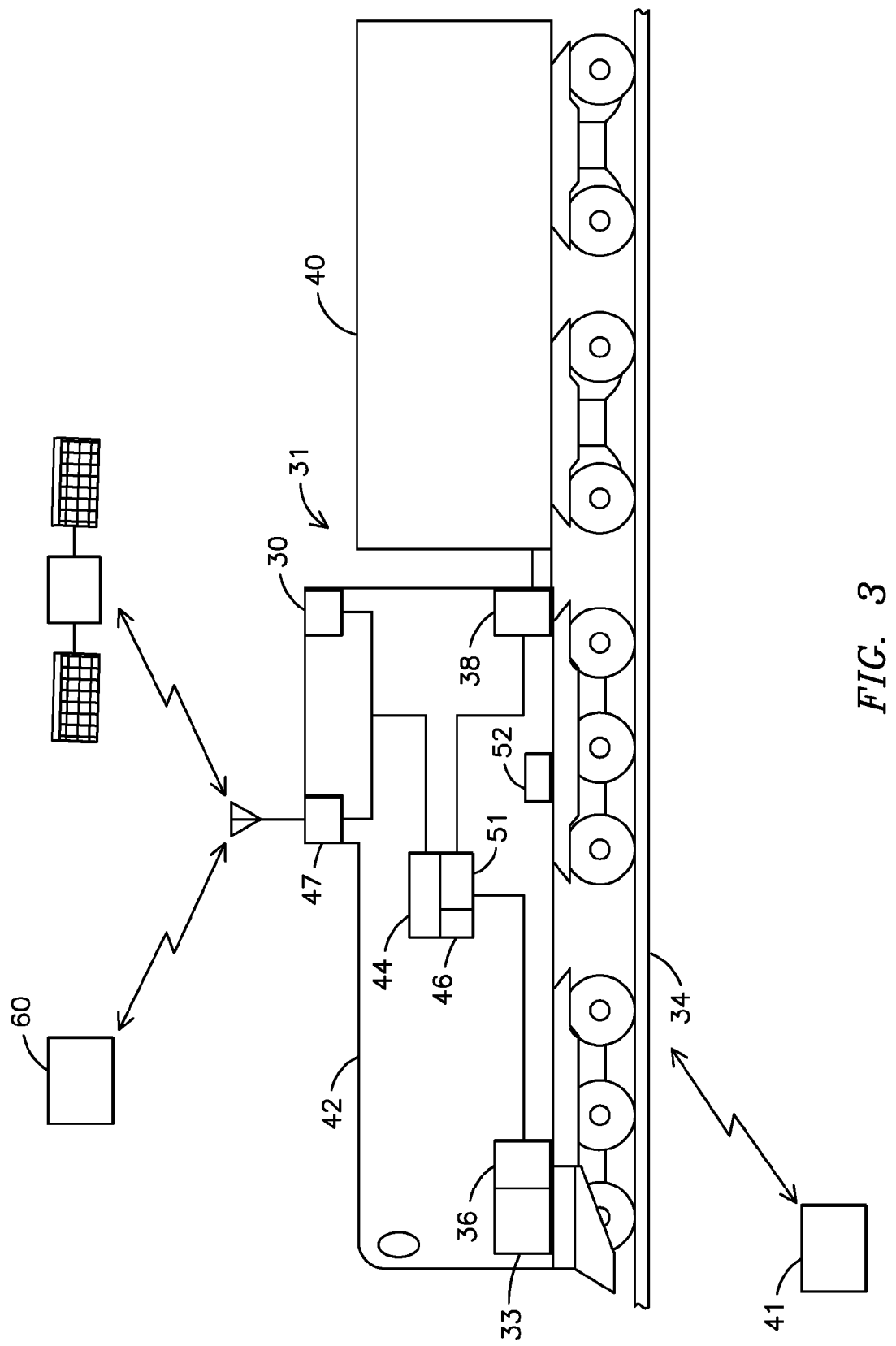
FIG. 3 depicts an exemplary embodiment of elements of a trip optimization system.
Figure 7:
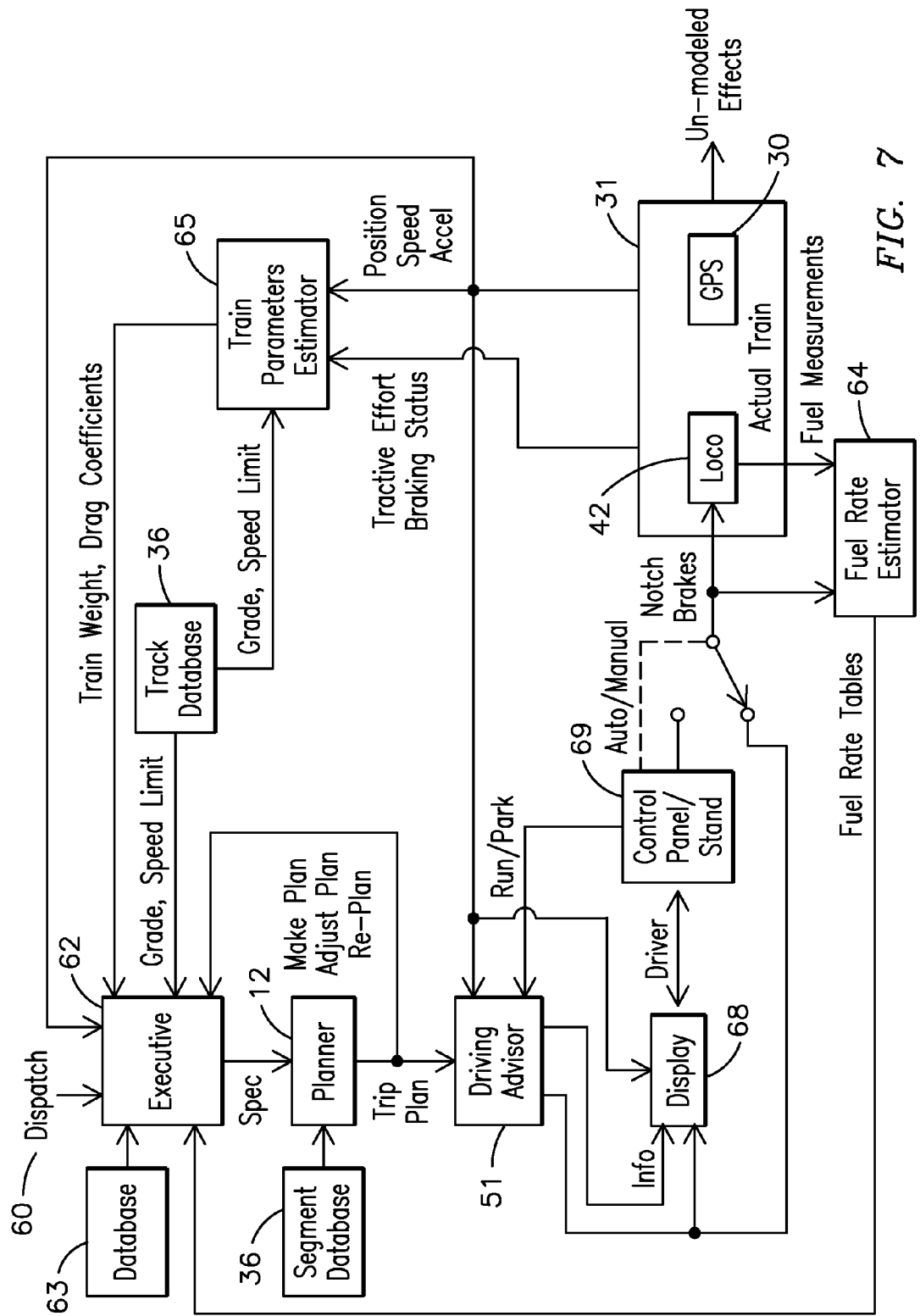
FIG. 7 is a flow chart/schematic diagram of an additional embodiment of a method and system for trip optimization.

FIG. 1 is a flow chart illustrating an exemplary embodiment of a method for controlling a vehicle or other powered system through trip/mission optimization. FIGS. 2, 3 and 7 show various elements of a powered system (e.g., train) that includes a trip or mission optimizer system 12 configured to carry out the method shown in FIG. 1, or a similar method. As illustrated, instructions are input specific to planning a trip either on board the vehicle or from a remote location, such as a dispatch center 10. Such input information includes, but is not limited to, train position, consist composition (such as locomotive models), locomotive tractive power, performance of locomotive traction transmission, consumption of engine fuel as a function of output power, cooling characteristics, intended trip route (including effective track grade, actual track grade, location of curves and track switches as a function of milepost, the "effective track grade," which is also a function of milepost, reflects track curvature, following standard railroad practices), car makeup and loading (including effective drag coefficients), desired trip parameters including, but not limited to, start time and location, end location, travel time, crew (user and/or operator) identification, crew shift expiration time, and trip route.

This data may be provided to the locomotive 42 (see FIG. 3) according to various techniques and processes, such as, but not limited to, manual operator entry into the locomotive 42 via an onboard display, linking to a data storage device such as a hard card, hard drive, server, and/or USB flash drive, or transmitting the information via a wireless communications channel from a central or wayside location 41, such as a track signaling device and/or a wayside device, to the locomotive 42.

Locomotive 42 and train 31 load characteristics (e.g., drag) may also change over the route (e.g., with altitude, ambient temperature, and condition of the rails and rail-cars), and the plan may be updated to reflect such changes, as needed, according to any of the methods discussed herein. The updated data that affects the trip optimization process can be supplied by any of the methods and techniques described herein and/or by real-time autonomous collection of locomotive/train conditions. Such updates include, for example, changes in locomotive or train characteristics detected by monitoring equipment on or off board the locomotive(s).

A signal system indicates certain track conditions and provides instructions to the operator of a train approaching the signal. The signaling system, which is described in greater detail below, indicates, for example, an allowable train speed over a segment of track and provides stop and run instructions to the train operator. Details of the signal system, including the location of the signals and the rules associated with different signals, are stored in an onboard database 63.

Based on the specification data input into the trip optimizer system, an optimal trip plan that minimizes track and wheel wear, fuel use, and/or generated emissions subject to speed limit constraints and a desired start and end time is computed to produce a trip profile or plan 12a. The optimal trip plan may also reduce wheel and track wear by commanding the locomotive(s) to a reduced speed when track curves and switches are encountered. The profile contains the optimal speed and power (notch) settings for the train to follow, expressed as a function of distance and/or time from the beginning of the trip, train operating limits, including but not limited to, the maximum notch power and brake settings, speed limits as a function of location, and the expected fuel used and emissions generated. (Thus, as should be appreciated, the trip profile is a set or list of control settlings of a train or other vehicle for implementing or following a trip plan.) In an exemplary embodiment, decisions regarding a change to the notch setting or dynamic brake setting can be made about once every 10 to 30 seconds.

Those skilled in the art will readily recognize that the throttle change decisions may occur at longer or shorter intervals, if needed and/or desired to follow an optimal speed profile and/or to limit wear. In a broader sense, it should be evident to one skilled in the art that the profiles provide power settings for the train, either at the train level, consist level, and/or individual locomotive level. As used herein, power comprises dynamic braking power, motoring power, and airbrake power. In another embodiment, instead of operating at the traditional discrete notch power settings, the trip optimizer system determines a desired power setting, from a continuous range of power settings, to optimize the speed profile. Thus, for example, if an optimal profile specifies a notch setting of 6.8, instead of a notch setting of 7 (assuming discrete notch settings of, e.g., 6, 7, 8, and so on), the locomotive 42 operates at notch 6.8. Allowing such intermediate power settings may provide additional efficiency benefits as described herein.

The procedure for computing the optimal profile can include any number of methods for computing a power sequence that drives the train 31 to minimize fuel, wear, and/or emissions subject to locomotive operating and schedule constraints, as summarized elsewhere herein. In some situations the optimal profile may be sufficiently similar to a previously determined profile due to the similarity of train configurations, route, and environmental conditions. In these cases it may be sufficient to retrieve the previously-determined driving trajectory from the database 63 and operate the train accordingly.

When a previous plan is not available, methods to compute a new plan include, but are not limited to, direct calculation of the optimal profile using differential equation models that approximate train physics of motion. According to this process, a quantitative objective function is determined; commonly the function comprises a weighted sum (integral) of model variables that correspond to a fuel consumption rate and emissions generated plus a term to penalize excessive throttle variations.

An optimal control formulation is established to minimize the quantitative objective function subject to constraints including but not limited to, speed limits (especially to limit wheel and track wear on track curves and through switches), minimum and maximum power (throttle) settings, and maximum cumulative and instantaneous emissions. Depending on planning objectives at any time, the problem may be implemented flexibly to minimize fuel subject to constraints on emissions and speed limits, or to minimize emissions subject to constraints on fuel use and arrival time, or to minimize wheel and track wear subject to speed constraints.

It is also possible to establish, for example, a goal to minimize the total travel time without constraints on total emissions, wear, or fuel use where such relaxation of constraints would be permitted or required for the mission.

Throughout the document exemplary equations and objective functions are presented for minimizing locomotive fuel consumption and wheel and track wear. These equations and functions are for illustration only as other equations and objective functions can be employed to optimize fuel consumption, fuel efficiency, emissions, or other locomotive/train performance or mission parameters.

Mathematically, the problem to be solved may be stated more precisely. The basic physics are expressed by:

$$\frac{dx}{dt} = v; x(0) = 0.0; x(T_f) = D$$

$$\frac{dv}{dt} = T_e(u, v) - G_a(x) - R(v); v(0) = 0.0; v(T_f) = 0.0$$

where x is the position of the train, v is train velocity, t is time (in miles, miles per hour, and minutes or hours, as appropriate), and u is the notch (throttle) command input. Further, D denotes the distance to be traveled, $T_f$ the desired arrival time at distance D along the track, $T_e$ is the tractive effort produced by the locomotive consist, $G_a$ is the gravitational drag (which depends on train length, train makeup and travel terrain), and R is the net speed dependent drag of the locomotive consist and train combination. The initial and final speeds can also be specified, but without loss of generality are taken to be zero here (train stopped at beginning and end of the trip). The model is readily modified to include other important dynamics such the lag between a change in throttle, u, and the resulting tractive effort or braking. Using this model, an optimal control formulation is set up to minimize the quantitative objective function subject to constraints including but not limited to, speed limits and minimum and maximum power (throttle) settings. Depending on planning objectives at any time, the problem may be set up flexibly to minimize fuel subject to constraints on emissions and speed limits, or to minimize emissions, subject to constraints on fuel use and arrival time. It is also possible to implement, for example, a goal to minimize the total travel time without constraints on total emissions or fuel use if such relaxation of constraints are permitted or required for the mission.

All these performance measures can be expressed as a linear combination of any of the following:

1.

$$\min_{u(t)} \int_0^{T_f} F(u(t)) dt$$

—Minimize total fuel consumption

2. 
$$\min_{u(t)} T_f$$

—Minimize Travel Time

3. 
$$\min_{u_i} \sum_{i=2}^{n_d} (u_i - u_{i-1})^2$$

—Minimize notch jockeying (piecewise constant input)

4. 
$$\min_{u(t)} \int_0^{T_f} \left(\frac{du}{dt}\right)^2 dt$$

—Minimize notch jockeying (continuous input)

5. Replace the fuel term F(·) in Equation 1 with a term corresponding to emissions production. For example for emissions $$\min_{u(t)} \int_0^{T_f} E(u(t)) dt$$

—Minimize total emissions.

6. 
$$\min_{u(t)} \int_0^{T_f} L(x(t), v(t), u(t)) dt$$

—Minimize total wear

In this equation E is the quantity of emissions in grams per horsepower-hour (gm/hp-hr) for each of the notches (or power settings), and L is proportional to the combined "loss" rate of wheel and rail wear in (mm³) of material at location x moving a speed v at time t. In addition, a minimization can be accomplished based on weighted values of fuel, emissions and wear.

A representative objective function is thus $$\min_{u(t)} \left[ \alpha_1 \int_0^{T_f} F(u(t))dt + \alpha_2 \int_0^{T_f} \left(\frac{du}{dt}\right)^2 dt + \alpha_3 T_f + \alpha_4 \int_0^{T_f} L(x(t), v(t), u(t)) dt \right] \quad \text{(OP)}$$

The coefficients, $\alpha_i$, of the linear combination depend on the importance (weight) given to each of the terms. Note that in equation (OP), u(t) is the optimizing variable that is the continuous notch position. If a discrete notch is required, e.g. for older locomotives, the solution to equation (OP) is discretized, which may result in lower fuel savings or greater wear on the wheels and track. Finding a minimum time solution ($\alpha_1$, $\alpha_4$ set to zero and $\alpha_2$ set to zero or a relatively small value) is used to find a lower bound for the achievable travel time ($T_f = T_{fmin}$) In this case, both u(t) and $T_f$ are optimizing variables. In one embodiment, equation (OP) is solved for various values of $T_f$ with $T_f > T_{fmin}$ with $\alpha_3$ and $\alpha_4$ set to zero. In this latter case, $T_f$ is treated as a constraint.

For those familiar with solutions to such optimal problems, it may be necessary to adjoin constraints, e.g., the speed limits along the path:

$$0 \le v \le SL(x)$$

or when using minimum time as the objective, the adjoined constraint may be that an end point constraint must hold, e.g., total fuel consumed must be less than what is in the tank, for example via:

$$0 < \int_0^{T_f} F(u(t)) dt \le W_F$$

where $W_F$ is the fuel remaining in the tank at $T_f$. Those skilled in the art will readily recognize that equation (OP) can presented in other forms and that the version above is an exemplary equation for use in one embodiment of the present invention.

The wear rate term, L, in equation (OP) can be a complex function of various track parameters and resulting (dynamic) vertical and lateral forces produced by the locomotive(s) and each of the attached rail cars in the train. The predominant track-dependent factors comprise the radius of curvature R, the gauge (rail-spacing) and super-elevation or cant of the track toward or away from a radius of curvature of the track, and track head geometry (e.g., a profile of the contoured or upper surface of the track in contact with the locomotive and rail car wheels or the surface on which the wheels roll). Predominant train-dependent parameters comprise the rolling wheel geometry and truck (axle suspension) design, and total number of axles (e.g., typically six axles per locomotive (three axles on each of two trucks) and four axles on freight rail cars (two axles on each of two trucks).

One embodiment of the present invention uses a useful surrogate for the exact rate of wear in curved track that is nevertheless indicative of realistic train operation, with wear defined in terms of a "cant deficiency," defined as:

$$CD = \frac{\text{gauge}}{\sqrt{\left(\frac{1 + R^2 g^2}{V^4}\right)}} - se \quad \text{(CD)}$$

where gauge is the track gauge (lateral spacing between rails, in meters and commonly 4 ft, 8.5" in North America or 1.435 meters), se is the super-elevation of the track, R is the radius of curvature (m) corresponding to a track curvature in degrees subtended by 100 feet of arc (or R in feet=(100*180)/($\alpha$ [degrees]*pi), g is the acceleration due to gravity, and V is the train speed (m/s). The resulting cant deficiency (CD) is commonly expressed as a linear distance measurement (mm or inches). The actual amount of rail and wheel wear that occurs with a specific cant deficiency value can best be determined by collecting empirical data.

When CD=0, the net centrifugal force on the wheel outer flange balances (or cancels) a horizontal component of the gravitational force acting on the rail car. (Recall that as a railcar travels through a super-elevated curve, the railcar forms an angle with the vertical. Thus the gravitational force includes both a vertical and a horizontal component.) Thus, with CD=0 the lateral forces on the inner and outer wheel flanges are minimum. Note that the outer wheel flange rides along an inside surface of the outer rail as the train travels through a curve and the inner wheel flange rides along an inside surface of the inner rail as the train travels through the curve.

When CD>0, the centrifugal force exceeds gravitational lateral forces, resulting in increased outer flange loading and wear. When CD<0, centrifugal forces are less than the lateral gravitational forces and the inner wheel flange experiences increased loading and wear.

Figure 15:
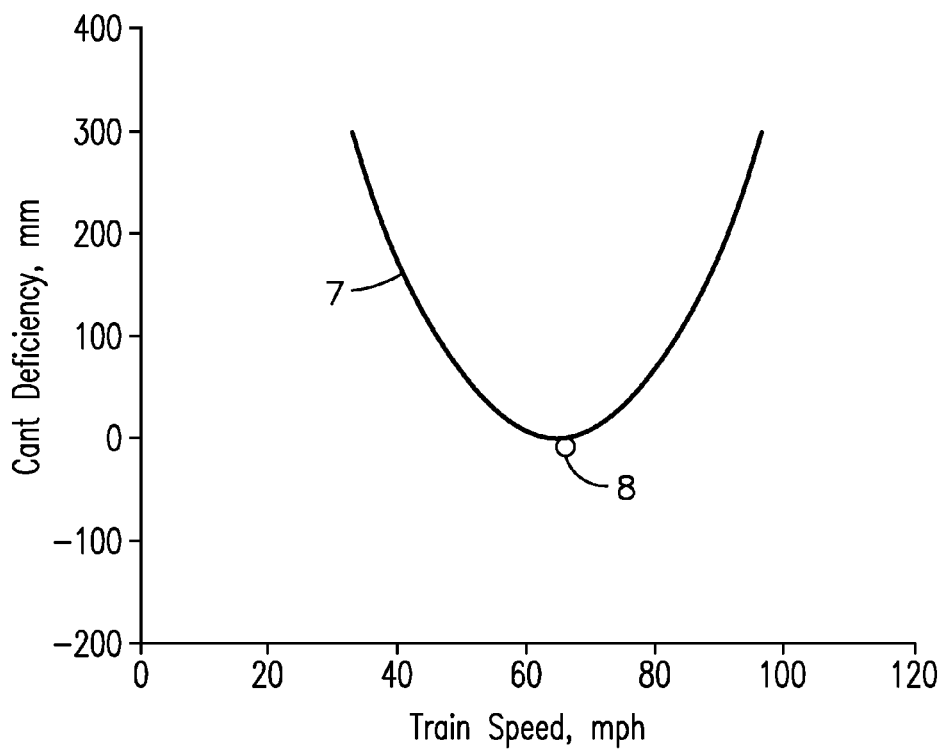
FIG. 15 depicts a wheel/rail wear cost function using a cant deficiency parameter.

FIG. 15 depicts an exemplary wheel wear cost function curve 7 (an x-axis depicting train speed and a y-axis depicting the cant deficiency) for a 2° curvature, 6 inches=125.4 mm of super-elevation, a curve radius of 873.2 m, and a track gauge of 56.5 inches. For the presented cost function, at a speed of about 66 mph (a point 8 on the curve 7) the inwardly and outwardly directed forces balance and the wheel wear is minimized.

Figure 16:
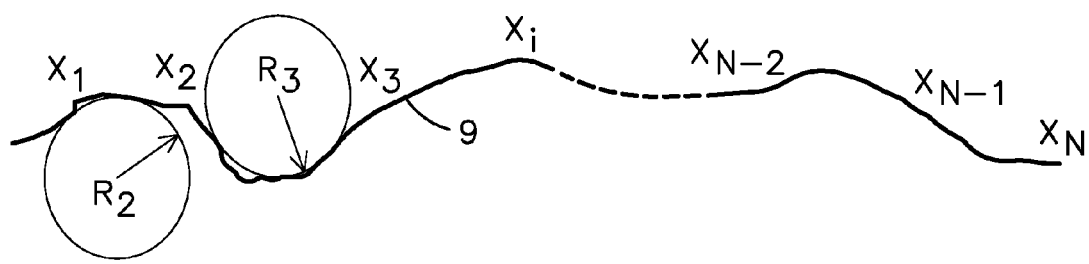
FIG. 16 depicts a track segment.

Historically the CD formula set forth above has been used to define required super-elevation and minimum curvature for a desired operating speed through a curve. FIG. 16 illustrates a length of track 9 including track segments (e.g., curves) $X_1$ through $X_N$. For the present optimization application, the generalized form for a wear cost function for a track segment comprising the curves i=0 through i=N as shown in FIG. 16 is:

$$L = \sum_{i=1}^{N} L_i$$

where, $$L_i(x, V(x(t)), u(t); R_i, se_i) = \begin{cases} \lambda_i CD_i^2 : x \in (x_{i-1}, x_i) \\ 0 : x \notin (x_{i-1}, x_i) \\ \lambda_i \geq 0 \end{cases}$$

referred to herein as equation (W).

The values $\lambda_i$ are wear weighting factors that weight the relative importance of producing wear on each track segment i. That is, the wear weighting factors are multiplied by the cant deficiency to produce a weighted cant deficiency value that is directly related to the wheel and rail wear as described herein. The rail and/or wheel wear for certain sections of track may be more critical than for other track section. The weighting factors can accommodate these variations. The weighting values are assigned to each curve segment i by the system operator, dependent on train operational parameters and the relative importance of train, track and performance variables that the operator considers in optimizing a train trip. The $\lambda_i$ terms also dimensionally normalize wear rates to units that are compatible with time, fuel consumed, or the units of the cost function.

Those familiar with wheel and rail wear processes recognize that more complex expressions to relate wheel and rail wear to the track parameters and operating speed could be substituted for equation (W), including approximations based on experimental regression to measurement, finite-element, and statistical methods.

Another approach according to another embodiment of the invention uses the equation (CD) directly as a constraint on each track segment, instead of including the equation in the optimizing cost function, e.g., as $|CD_i| \leq d_i$
or $$-a_i \leq CD_i \leq b_i$$

where the first equation immediately above constrains a magnitude of the cant deficiency to less than or equal to a user-selected value $d_i$ for each track segment i. The second equation constrains the cant deficiency to an interval between $-a$ and $b$ for each track segment i. In one embodiment, an on-board processor 44 controls the applied tractive and braking forces of a train and/or locomotive such that a cant deficiency parameter (CD) is about zero (e.g., zero distance units) or greater than zero, either for a particular track segment or when using other determinations/considerations of CD as described above, as part of determining a trip plan or otherwise. The closer the CD value is to zero the less wear the wheels and rails experience. Generally, a positive cant (tilt) deficiency is desired, with actual numerical values dictated by railroad and/or government practices/regulations. In another embodiment, an on-board processor 44 controls the applied tractive and braking forces of a train and/or locomotive such that a maximum cant deficiency parameter is between about −300 mm and about 300 mm. This range represents a fairly linear range of cant deficiency where wear is reduced at typical speeds and for typical track profiles.

Note that for all the above equations the points of segmentation, $x_i$, can be arbitrarily chosen, but in one embodiment points are selected where a curvature inflection changes (e.g., start and endpoints of track curvature).

Locomotives and other powered systems often utilize diesel internal combustion engines as a power source, for driving an alternator that produces electricity for running DC or AC traction motors. Accordingly, reference to emissions in the context of the present invention is generally directed to cumulative emissions produced in the form of oxides of nitrogen (NOx), carbon oxide (COx), hydrocarbons (HC), particulate matter (PM), etc. (Embodiments of the present invention are also applicable to powered systems that use engines and/or fuel types other than diesel, such as heavy marine fuels, ethanol and other alcohols, palm oil, bio-diesel, gasoline, and blends thereof.) Other emissions may include, but are not limited to, a maximum value of electromagnetic emission, such as a limit on radio frequency (RF) power output, measured in watts, for respective frequencies emitted by the locomotive. Yet another form of emission is the noise produced by the locomotive, typically measured in decibels (dB). An emission requirement may be variable based on a time of day, a time of year, and/or atmospheric conditions such as weather or pollutant level in the atmosphere.

Emission regulations may vary geographically across a railroad system. For example, an operating area such as a city or state may have specified emission objectives, and an adjacent area may have different emission objectives, for example a lower amount of allowed emissions or a higher fee charged for a given level of emissions.

Accordingly, an emission profile for a certain geographic area may be tailored to include maximum emission values for each of the regulated emissions including in the profile to meet a predetermined emission objective required for that area. Typically, for a locomotive, these emission parameters are determined by, but not limited to, the power (notch) setting, ambient conditions, engine control method, etc. By design, every locomotive must be compliant with EPA emission standards, and thus, in an embodiment of the present invention that optimizes emissions, this may refer to mission-total emissions, for which there is no current EPA specification. Operation of the locomotive according to the optimized trip plan is at all times compliant with EPA emission standards. Those skilled in the art will readily recognize that because diesel engines are used in other applications, other regulations may also be applicable. For example, $CO_2$ emissions are considered in certain international treaties.

If an objective during a trip/mission is to reduce emissions (or, for example, to reduce wheel and track wear), the optimal control formulation, equation (OP), would be amended to consider this trip objective. A key flexibility in the optimization process is that any or all of the trip objectives can vary by geographic region or mission. For example, for a high priority train, minimum time may be the only objective on one route because of the train's priority. In another example, emission output could vary from state to state along the planned train route. Generally, trip/mission performance components may include: performance time (arrival and/or departure times or time interval between stops), fuel efficiency, fuel consumption, emissions, class of service, wheel wear, track wear, infrastructure wear (e.g., wear associated with track switches and track switch components), in-train forces, lateral and vertical wheel/rail interface forces, and the like. Each mission performance component has an associated desired objective for the mission. Notwithstanding these objectives for each component, the train operating parameters are selected (by the operator or by the trip optimizer) such that selected ones of the mission performance components are minimized, others are maximized, and still others are treated as hard constraints (i.e., a constraint that cannot be violated during the trip or mission). For example, the amount of fuel used may be considered a hard constraint as additional fuel cannot be obtained until the train arrives at a fuel depot. Since the amount of fuel to burn is limited (constrained), it may not be possible to strictly minimize wheel wear. That is, the wheels would experience less wheel wear if train operating parameters were selected assuming that an unlimited quantity of fuel was available.

To solve the resulting optimization problem, in an exemplary embodiment a dynamic optimal control problem in the time domain is transcribed to an equivalent static mathematical programming problem with N decision variables, where the number 'N' depends on the frequency at which throttle and braking adjustments are made and the duration of the trip. For typical problems, this N can be in the thousands. For example, suppose a train is traveling a 172-mile (276.8 kilometers) stretch of track in the southwest United States. Utilizing the trip optimizer system, a 7.6% fuel consumption reduction may be realized when comparing a trip determined and followed using the trip optimizer system a trip where the throttle/speed is determined by the operator according to standard practices. The improved savings is realized because the trip optimizer system produces a driving strategy with both less drag loss and little or no braking loss compared to the operator-controlled trip.

To make the optimization described above computationally tractable, a simplified model of the train may be employed, such as a model illustrated in FIG. 2 and set forth in the equations discussed above. As illustrated, certain specifications, such as but not limited to information about the consist, route information, train information, and/or trip information, are considered to determine a profile, such as an optimized profile. Such factors incorporated in the profile may include, but are not limited to, speed, distance remaining in the mission, and/or fuel used. As disclosed elsewhere herein, other factors that may be included in the profile are notch setting and time. One possible refinement to the optimal profile is produced by deriving a more detailed model with the optimal power sequence generated, to test if any thermal, electrical and mechanical constraints are violated. This leads to a modified profile with speed versus distance that is closest to a run that can be achieved without damaging the locomotive or train equipment, i.e., satisfying additional implied constraints such as thermal and electrical limits on the locomotive and inter-car forces in the train and express constraints such as wheel and track wear. Those skilled in the art will readily recognize how the equations discussed herein are utilized with FIG. 2.

Referring back to FIG. 1, once the trip is started with a trip plan 12a, power commands are generated 14 to put the mission plan in motion. Depending on the operational set-up of the trip optimizer system, one command is for the locomotive to follow the optimized power command 16 so as to achieve optimal speed and minimize wear. The trip optimizer system obtains actual speed and power information 18 from the locomotive consist of the train. Due to the approximations in the models used for the optimization, a closed-loop calculation of corrections to optimized power is obtained to track the desired optimal speed. Such corrections of train operating limits can be made automatically or by the operator, who always has ultimate control of the train and can override locomotive controls ordered by the trip plan.

In some cases, the model used in the optimization may differ significantly from the actual train. This can occur for many reasons, including but not limited to, extra cargo pickups or setouts, locomotives that fail in-route, errors in the initial database 63, and data entry errors by the operator. For these reasons a monitoring system is in place that uses real-time train data to estimate locomotive and/or train performance in real time 20. The estimated performance components are compared to the performance components assumed when the trip was initially created 22. Based on any differences in the assumed and estimated values, the trip may be re-planned 24. A re-plan will be made especially if a sufficiently sizable savings (e.g., time savings or money savings) will accrue from a new plan.

Other reasons a trip may be re-planned include directives from a remote location, such as dispatch, and/or an operator request of a change in plan objectives to be consistent with global movement planning objectives. Additional global movement planning objectives may include, but are not limited to, other train schedules, time required to dissipate exhaust from a tunnel, maintenance operations, etc. Another reason may be due to an onboard failure or degradation of a component. Strategies for re-planning may be grouped into incremental and major adjustments depending on the severity of the disruption, as discussed in more detail elsewhere herein. In general, a "new" plan must be derived from a solution to the optimization problem equation (OP) described above, but frequently faster approximate solutions can be found, as described herein.

Figure 4:
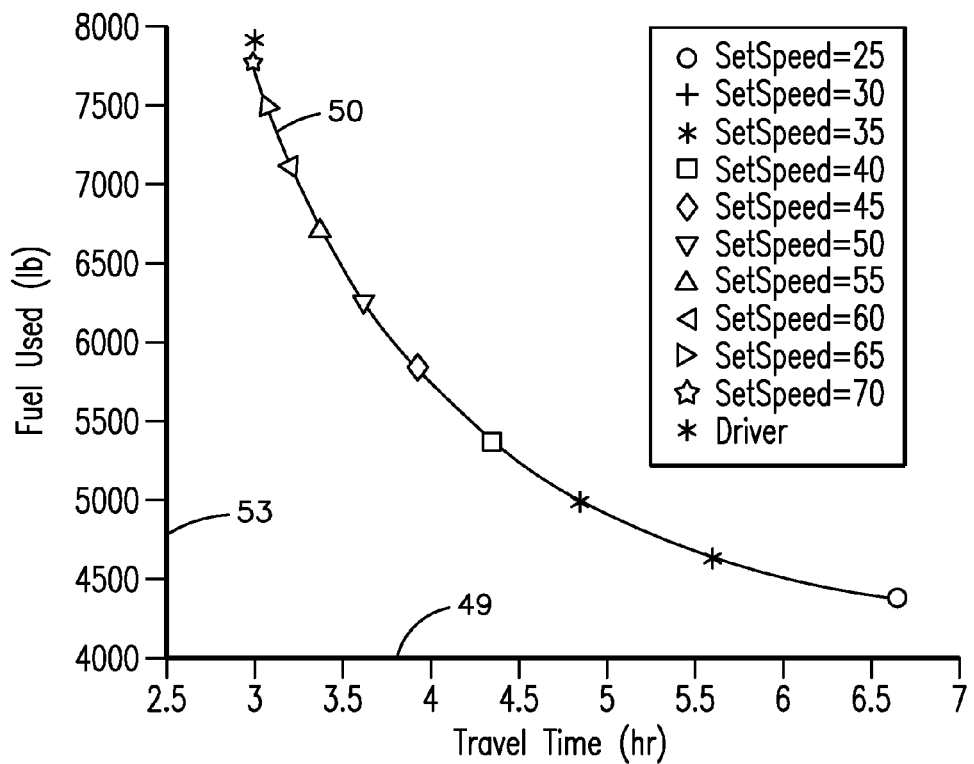
FIG. 4 depicts an exemplary embodiment of a fuel-use/travel time curve.

In operation, the locomotive 42 will continuously monitor system efficiency and continuously update the trip plan based on the actual measured efficiency, whenever such an update would improve trip performance. Re-planning computations may be carried out entirely within the locomotive(s) or fully or partially performed at a remote location, such as dispatch or wayside processing facilities where wireless technology is used to communicate the new plan to the locomotive 42. In one embodiment, the trip optimizer system may also generate efficiency trends for developing locomotive fleet data regarding efficiency transfer functions. The fleet-wide data may be used when determining the initial trip plan, and may be used for network-wide optimization tradeoff when considering locations of a plurality of trains. For example, the travel-time fuel-use tradeoff curve as illustrated in FIG. 4 reflects a capability of a train on a particular route at a current time, updated with ensemble averages collected for many similar trains on the same route. Thus, a central dispatch facility collecting curves like FIG. 4 from many locomotives could use that information to better coordinate overall train movements to achieve a system-wide advantage in fuel use or throughput. A similar curve can be constructed for travel time (or another variable, such as fuel consumption) versus wheel wear or track wear. Thus, the operator or dispatcher can select speeds to trade off greater wheel/track wear for a reduction in the travel time (or, for example, greater fuel consumption or greater emissions).

Many events during daily operations may motivate the generation of a new or modified plan, including a new or modified trip plan that retains the same trip objectives, for example, when a train is not on schedule for a planned meet or pass with another train and therefore must make up the lost time. Using the actual speed, power and location of the locomotive, a planned arrival time is compared with a currently estimated (predicted) arrival time 25. Based on a difference in the times, as well as the difference in performance parameters (detected or changed by dispatch or the operator) the plan is adjusted 26. This adjustment may be made automatically according to a railroad company's policy or desire for how such departures from plan should be handled, or alternatives may be manually proposed for the on-board operator and dispatcher to jointly decide the best approach for returning to plan.

Whenever a plan is updated, in the case where the original performance objectives (such as, but not limited to, arrival time) remain the same, additional changes may be concurrently factored in, e.g., new future speed limit changes, which could affect the feasibility of recovering the original plan. In such instances, if the original trip plan cannot be maintained, or in other words the train is unable to meet the original trip plan objectives, as discussed herein other trip plan(s) may be presented to the operator, remote facility, and/or dispatch.

A re-plan 24, or an adjustment to a plan 26, may also be made when it is desired to change the original objectives. Such re-planning can be done at either fixed preplanned times, manually at the discretion of the operator or dispatcher, or autonomously when predefined limits, such a train operating limits (for example, calculated wheel and track wear), are exceeded. For example, if the current plan execution is running late by more than a specified threshold, such as thirty minutes, the trip optimizer system can re-plan the trip to accommodate the delay at the expense of increased fuel consumption or wear, as described above, or to alert the operator and dispatcher as to the extent to which lost time can be regained, if at all (e.g., what is the minimum time remaining or the maximum fuel that can be saved within a time constraint).

Other triggers for re-plan can also be envisioned based on fuel consumed or the health of the power consist, including but not limited time of arrival, loss of horsepower due to equipment failure and/or equipment temporary malfunction (such as operating too hot or too cold), and/or detection of gross setup errors, such in the assumed train load. That is, if the change reflects impairment in the locomotive performance for the current trip, these may be factored into the models and/or equations used in the optimization process.

Changes in plan objectives can also arise from a need to coordinate events where the plan for one train compromises the ability of another train to meet its plan objectives and resolution at a different level, e.g., the dispatch office, is required. For example, the coordination of meets and passes may be further optimized through train-to-train communications. Thus, as an example, if an operator knows he is behind schedule in reaching a location for a meet and/or pass, communications from the other train can advise the operator of the late train (and/or dispatch). The operator can enter information pertaining to the expected late arrival into the trip optimizer system for recalculating the train's trip plan. The trip optimizer system can also be used at a higher level or network-level, to allow a dispatch to determine which train should slow down or speed up should it appear that a scheduled meet and/or pass time constraint may not be met. As discussed herein, this is accomplished by trains transmitting data to dispatch to prioritize how each train should change its planning objective. A choice can be made either based on schedule or fuel saving benefits, depending on the situation.

Therefore, as explained herein, a re-plan 24 or adjustment to a plan 26, as illustrated in FIG. 1, may be carried out either independent of dispatch or in coordination with dispatch. Furthermore, as disclosed herein, a re-plan may be initiated, in whole or in part, based on information received at the powered vehicle from dispatch or on information that originates from other sources, such as, but not limited to another powered vehicle passing nearby and/or a wayside device or equipment.

With respect to a train 31, one example relates to a situation where dispatch 60 determines that a train operator has entered incorrect information for optimizing a mission plan. In this example, when information is entered by the operator, such as, but not limited to, through a control counsel and/or display 68, for generating an optimized trip plan, the information is transmitted to dispatch 60 remote from the train. A wired and/or wireless communication system 47 is used for communicating with dispatch 60. Dispatch verifies the information. Dispatch may be an individual at a remote location or a remote system having a processor that is able to determine if the information provided is correct for the intended mission. If the information is incorrect, the trip/mission plan originally generated using the incorrect information may be adjusted, re-planned, or otherwise revised using new, correct, and/or corrected information (collectively, updated information). The source of this second information may come from the dispatch and/or any other system that may provide information updates to the train. Verification and, if required, re-plan may occur prior to commencing the mission, and/or while the mission is progressing.

Changes to the optimized mission plan may also be made when updated information has a bearing on the currently implemented mission. One example of when such updated information may be used includes, but is not limited to, when the train is performing other than as contemplated with a current mission plan, e.g., the train's performance degrades at some point while an original mission plan is being followed. The change in performance may also be attributed to degraded operation capability of a rail infrastructure (or route infrastructure, e.g., recent wheel or track wear), crew change, time-out, if the operator decides to manually operate the train and then returns control for autonomous operation, or the like. In another example, updated information is received from at least one other train, such as through inter-train communication, a wayside device, and/or another localized source. Information is transferred train-to-train when the transmitting train has needed information. This information can include, but is not limited to, information learned based on track that the transmitting train has recently traversed and/or information relayed to the transmitting train when it was in communication with dispatch for transmitting to other trains that are unable to communicate with dispatch due to a communication interruption. In yet another example, such updated information may include a change in a mission objective, e.g., the train is reclassified from a high priority level to a low priority level. Where the train is operating with other trains (such as, but not limited to, on multi-section tracks in an intersecting railroad network), the updated information may provide for further optimizing the particular train's mission to ensure that all trains using the same network of railways are operated safely and where no prolonged delays to any trains are realized, such as having to wait too long at a meet and pass location.

Re-planning may be performed on board the train, even when dispatch is unaware of information that causes the re-planning to take place. In such a situation, dispatch is subsequently informed of the re-plan.

For any of the manually or automatically initiated re-plans, the trip optimizer system may present more than one trip plan to the operator. In one embodiment, the trip optimizer system presents different trip profiles to the operator, allowing the operator to select the arrival time and also to understand the corresponding fuel, wear, and/or emission impact. Such information can also be provided to the dispatch for similar considerations, either as a simple list of alternatives or as a plurality of tradeoff curves such as illustrated in FIG. 4.

In one embodiment, the trip optimizer system has the ability to learn and adapt to key changes in the train and power consist that can be incorporated either in the current plan and/or in future plans. For example, one of the triggers discussed above is loss of horsepower. When building up horsepower over time, either after a loss of horsepower or when beginning a trip, transition logic is utilized to determine when a desired horsepower is achieved. This information can be saved in the locomotive database 61 for use in optimizing either future trips or the current trip should a loss of horsepower occur again later.

As noted above, FIG. 3 depicts various elements that may be part of the trip optimizer system 12, according to an embodiment of the invention. A locator element 30 (i.e., element for determining a location of the train on a segment of track) determines a location of the train 31. The locator element 30 may be a GPS sensor or a system of sensors that determine a location of the train 31. Examples of such other systems include, but are not limited to, wayside devices, such as radio frequency automatic equipment identification (RF AEI) tags, dispatch, and/or video-based determinations. Another system may use the tachometer(s) aboard a locomotive and distance calculations from a reference point. As discussed previously, a wireless communication system 47 may also be provided to allow communications between trains and/or with a remote location, such as dispatch 60. Information about travel locations may also be transferred from other trains over the communications system.

A track characterization element 33 (i.e., element for providing track characterization information for a segment of track) provides information about the track segment, principally grade, elevation, track switches, and curvature information, and the location of each track element. The track characterization element 33 may include an on-board track integrity database 36. Sensors 38 measure a tractive effort 40 applied by the locomotive consist 42, throttle setting of the locomotive consist 42, locomotive consist 42 configuration information, speed of the locomotive consist 42, individual locomotive configuration information, individual locomotive capabilities, etc. In an exemplary embodiment, the locomotive consist 42 configuration information may be loaded without the use of a sensor 38, but is input in other manners as discussed herein. Furthermore, the health of the locomotives in the consist may also be considered. For example, if one locomotive in the consist is unable to operate above power notch level 5 this information is used when optimizing the trip plan.

Information from the locator element may also be used to determine an appropriate arrival time of the train 31. For example, if there is a train 31 moving along a track 34 toward a destination and no train is following behind it, and the train has no fixed arrival deadline to satisfy, the locator element, including but not limited to radio frequency automatic equipment identification (RF AEI) tags, dispatch, and/or video-based determinations, may be used to determine the exact location of the train 31. Furthermore, inputs from signaling systems may be used to adjust the train speed and/or the amount of wear. Using the on-board track database, discussed below, and the locator element, such as GPS, the trip optimizer system can adjust the operator interface to reflect the signaling system state at the given locomotive location. In a situation where signal states indicate restrictive speeds ahead, the planner may elect to slow the train to conserve fuel consumption or reduce track and wheel wear.

Information from the locator element 30 may also be used to change planning objectives as a function of distance to a destination. For example, owing to inevitable uncertainties about congestion along the route, "faster" time objectives on the early part of a route may be employed as hedge against delays that statistically expected to occur later. If on a particular trip such delays do not occur, the objectives on a latter part of the journey can be modified to exploit the built-in slack time that was banked earlier and thereby recover some fuel efficiency or reduce wheel and track wear by commanding slower speeds. A similar strategy can be invoked with respect to emission-restrictive objectives, e.g., emissions constraints that apply when approaching an urban area.

As an example of the hedging strategy, if a trip is planned from New York to Chicago, the system may provide an option to operate the train slower at either the beginning of the trip, at the middle of the trip or at the end of the trip. In one embodiment, the trip optimizer system would optimize the trip plan to allow for slower operation at the end of the trip since unknown constraints, such as, but not limited to, weather conditions and track maintenance, may develop and become known during the trip. As another consideration, if traditionally congested areas are known, the plan is developed with an option to increase the driving flexibility around such regions. Therefore, the trip optimizer system may also consider weighting/penalizing as a function of time/distance into the future and/or based on known/past experiences. At any time during the trip, planning and re-planning may also take into consideration weather conditions, track conditions, other trains on the track, etc., wherein the trip plan is adjusted accordingly.

FIG. 3 further discloses other elements that may be part of the trip optimizer system 12. A processor 44 operates to receive information from the locator element 30, track characterizing element 33, and sensors 38. An algorithm 46 operates within the processor 44. The algorithm 46 computes an optimized trip/mission plan based on operating parameters involving the locomotive 42, train 31, track 34, (e.g., notch number, track condition) and objectives of the mission as described herein. In an exemplary embodiment, the trip plan is established based on models for train behavior as the train 31 moves along the track 34 as a solution of non-linear differential equations derived from applicable physics equations with simplifying assumptions that are provided in the algorithm. The algorithm 46 has access to the information from the locator element 30, track characterizing element 33 (e.g., the location of track curves and switches), and/or sensors 38 to create a trip plan minimizing fuel consumption of a locomotive consist 42, minimizing emissions of a locomotive consist 42, minimizing wheel and/or track wear, establishing a desired trip time, and/or ensuring proper crew operating time aboard the locomotive consist 42. In an exemplary embodiment, a driver or controller element 51 is also provided. As discussed herein, the controller element 51 may control the train as it follows the trip plan. In an exemplary embodiment discussed further herein, the controller element 51 makes train operating decisions autonomously. In another exemplary embodiment the operator may be involved with directing the train to follow or deviate from the trip plan in his discretion.

In one embodiment of the trip optimizer system 12, the trip plan 12a is modifiable in real time as the plan is being executed. This includes creating the initial plan for a long distance trip, owing to the complexity of the plan optimization algorithm. When a total length of a trip profile exceeds a given distance, an algorithm 46 may be used to segment the mission by dividing the mission into waypoints. Though only a single algorithm 46 is discussed, those skilled in the art will readily recognize that more than one algorithm may be used (and/or that the same algorithm may be executed a plurality of times) and that such multiple algorithms are linked to create the trip plan.

The trip waypoints may include natural locations where the train 31 stops, such as, but not limited to, single mainline sidings for a meet with opposing traffic or for a pass with a train behind the current train, a yard siding, an industrial spur where cars are picked up and set out, and locations of planned maintenance work. At such waypoints the train 31 may be required to be at the location at a scheduled time, stopped or moving with speed in a specified range. The time duration from arrival to departure at waypoints is called "dwell time."

In an exemplary embodiment, the trip optimizer system is able to break down a longer trip into smaller segments according to a systematic process. Each segment can be somewhat arbitrary in length, but is typically picked at a natural location such as a stop or significant speed restriction, or at key waypoints or mileposts that define junctions with other routes.

Given a partition or segment selected in this way, a driving profile is created for each segment of track as a function of travel time taken as an independent variable, such as shown in FIG. 4, discussed in more detail below. The fuel used/travel-time/wear tradeoff associated with each segment can be computed prior to the train 31 reaching that segment of track. A total trip plan can therefore be created from the driving profiles created for each segment. The trip optimizer system optimally distributes travel time among all segments of the trip so that the total trip time required is satisfied and total fuel consumed/wear experienced over all the segments is minimized. An exemplary three segment trip is disclosed in FIG. 6 and discussed below. Those skilled in the art will recognize however, although segments are discussed, the trip plan may comprise a single segment representing the complete trip.

FIG. 4 depicts an exemplary embodiment of a fuel-use/travel time curve. As mentioned previously, such a curve 50, or similar curves, is created when calculating an optimal trip profile for various travel times for each segment. That is, for a given travel time 51, fuel used 52 is the result of a detailed driving profile computed as described above. Once travel times for each segment are allocated, a power/speed plan is determined for each segment from the previously computed solutions. If there are any waypoint speed constraints between the segments, such as, but not limited to, a change in a speed limit, they are matched during creation of the optimal trip profile. If speed restrictions change only within a single segment, the fuel use/travel-time curve 50 has to be re-computed for only the segment changed. This process reduces the time required for re-calculating more parts, or segments, of the trip. If the locomotive consist or train changes significantly along the route, e.g., loss of a locomotive or pickup or set-out of railcars, then driving profiles for all subsequent segments must be recomputed creating new instances of the curve 50. These new curves 50 are then used along with new schedule objectives to plan the remaining trip.

Once a trip plan is created as discussed above, a trajectory of speed and power versus distance allows the train to reach a destination with minimum fuel, wear, and/or emissions at the required trip time. There are several techniques for executing the trip plan. As provided below in more detail, in one exemplary embodiment, when in an operator "coaching mode," control information is displayed to the operator for the operator to follow to achieve the required power and speed as determined according to the optimal trip plan. In this mode, the control information includes suggested operating conditions that the operator should use for driving the train. In another exemplary embodiment, control actions to accelerate the train or maintain a constant speed are performed autonomously by the trip optimizer system. However, when the train 31 must be slowed, the operator is responsible for applying brakes by controlling a braking system 52. In another exemplary embodiment, commands for powering and braking are provided as required to follow the desired speed-distance path.

Feedback control strategies are used to correct the power control sequence in the profile to account for such events as, but not limited to, train load variations caused by fluctuating head winds and/or tail winds. Another such error may be caused by an error in train characterization parameters, such as, but not limited to, train mass and/or drag, as compared with assumptions in the optimized trip plan. A third type of error may occur due to incorrect information in the track database 36. Another possible error may involve un-modeled performance differences due to the locomotive engine, traction motor thermal deration, and/or other factors. Feedback control strategies compare the actual speed as a function of position with the speed in the desired optimal profile. Based on this difference, a correction to the optimal power profile is added to drive the actual velocity toward the optimal profile. To ensure stable regulation, a compensation algorithm may be provided that filters the feedback speeds into power corrections to assure closed-loop performance stability. Compensation may include standard dynamic compensation as used by those skilled in the art of control system design to meet performance objectives.

The trip optimizer system provides the simplest and therefore fastest means to accommodate changes in trip objectives, which is the rule rather than the exception in railroad operations. In an exemplary embodiment, to determine the fuel-optimal trip from point "A" to point "B" where there are stops along the way, and for updating the trip for the remainder of the trip once the trip has begun, a sub-optimal decomposition method can be used for finding an optimal trip profile. Using modeling methods, the computation method can find the trip plan with specified travel time and initial and final speeds to satisfy all the speed limits and locomotive capability constraints when there are stops. Though the following discussion is directed to optimizing fuel use, it can also be applied to optimize other factors, such as, but not limited to, train wheel and track wear, emissions, schedule, crew comfort, and load impact. The method may be used at the outset in developing a trip plan, and more importantly to adapting to changes in objectives after initiating a trip.

Figure 5:
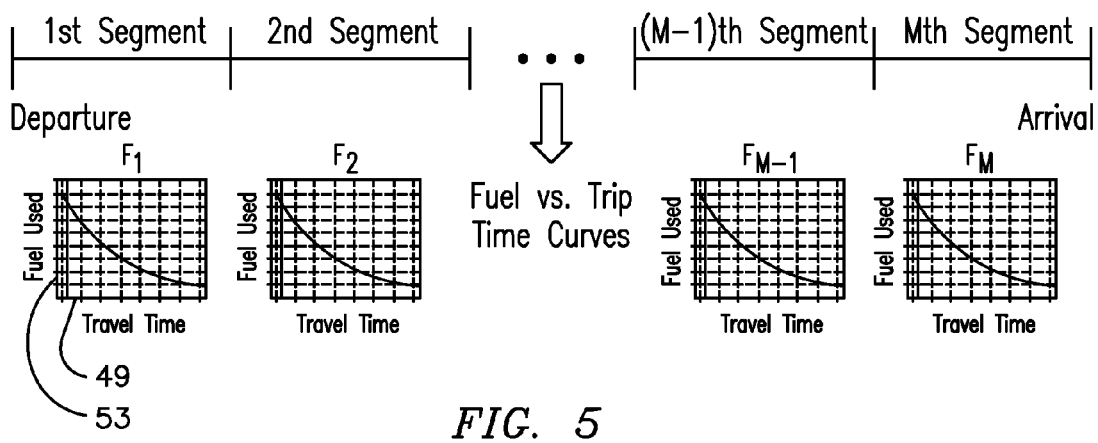
FIG. 5 depicts an exemplary embodiment of segmentation decomposition for trip planning.
Figure 6:
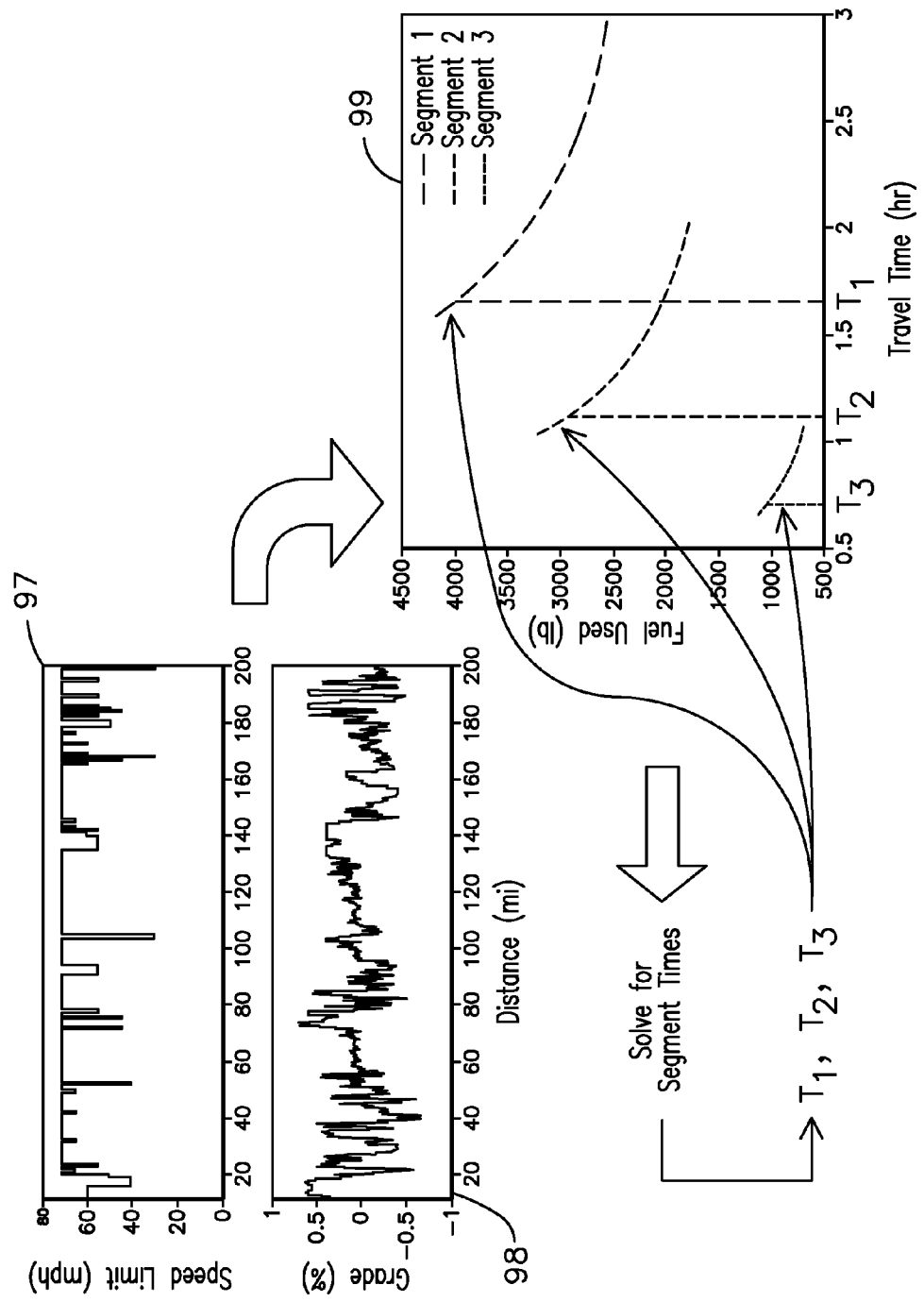
FIG. 6 depicts another exemplary embodiment of a segmentation decomposition for trip planning.

As discussed herein, embodiments of the present invention may employ a setup as illustrated in the flow chart depicted in FIG. 5, and as an exemplary three segment example depicted in detail in FIG. 6. As illustrated, the trip may be broken into two or more segments, T1, T2, and T3, though as discussed herein, it is possible to consider the trip as a single segment. As discussed herein, the segment boundaries may not result in equal-length segments. Instead, the segments use natural or mission specific boundaries. Optimal trip plans are pre-computed for each segment. If fuel use versus trip time is the trip object to be met, fuel versus trip time curves are generated for each segment. As discussed herein, the curves may be based on other factors, wherein the factors are objectives to be met with a trip plan. When trip time is the performance component being determined, trip time for each segment is computed while satisfying the overall trip time constraints.

FIG. 6 illustrates speed limits 97 for an exemplary three segment, 200 mile (321.9 km) trip. Further illustrated are grade changes 98 over the 200 mile (321.9 km) trip. A combined chart 99 illustrating curves of fuel usage for each segment of the trip over the travel time is also shown. Using the optimal control setup described previously and the computation methods described herein, the trip optimizer system can generate the trip plan with specified travel time and initial and final speeds, so as to satisfy all the speed limits and locomotive capability constraints when there are stops. Though the following detailed discussion is directed to optimizing fuel use, it can also be applied to optimize other factors as discussed herein, such as, but not limited to, wheel wear, track wear, and emissions. The trip optimizer system can accommodate desired dwell times at stops and considers constraints on earliest arrival and departure at a location as may be required, for example, in single-track operations where the time to enter or pass a siding is critical.

Exemplary embodiments of the present invention find a fuel-optimal trip from distance $D_0$ to $D_M$, traveled in time T, with M−1 intermediate stops at $D_1, \ldots, D_{M-1}$, and with the arrival and departure times at these stops constrained by:

$$t_{min}(i) \leq t_{arr}(D_i) \leq t_{max}(i) - \Delta t_i$$

$$t_{arr}(D_i) + \Delta t_i \leq t_{dep}(D_i) \leq t_{max}(i) \quad i=1, \ldots, M-1$$

where $t_{arr}(D_i)$, $t_{dep}(D_i)$ and $\Delta t_i$ are the arrival, departure, and minimum stop time at the ith stop, respectively. Assuming that fuel-optimality implies minimizing stop time, therefore $t_{dep}(D_i) = t_{arr}(D_i) + \Delta t_i$ which eliminates the second inequality above. Suppose for each i=1, ..., M, the fuel-optimal trip from $D_{i-1}$ to $D_i$ for travel time t, $T_{min}(i) \leq t \leq T_{max}(i)$, is known. Let $F_i(t)$ be the fuel-use corresponding to this trip. If the travel time from $D_{j-1}$ to $D_j$ is denoted $T_j$, then the arrival time at $D_i$ is given by $$t_{arr}(D_i) = \sum_{j=1}^{i}(T_j + \Delta t_{j-1})$$

where $\Delta t_0$ is defined to be zero. The fuel-optimal trip from $D_0$ to $D_M$ for travel time T is then obtained by finding $T_i$, i=1, ..., M, which minimizes $$\sum_{i=1}^{M} F_i(T_i) T_{min}(i) \leq T_i \leq T_{max}(i)$$

subject to $$t_{min}(i) \leq \sum_{j=1}^{i}(T_j + \Delta t_{j-1}) \leq t_{max}(i) - \Delta t_i \quad i=1, \ldots, M-1$$

$$\sum_{j=1}^{M}(T_j + \Delta t_{j-1}) = T$$

Once a trip is underway, the issue is re-determining the fuel-optimal solution (or a minimum wheel and/or track wear solution) for the remainder of the trip (originally from $D_0$ to $D_M$ in time T) as the trip is traveled, but where disturbances preclude following the fuel-optimal (or the minimum wheel and/or track wear solution) solution. Let the current distance and speed be x and v, respectively, where $D_{i-1} < x \leq D_i$. Also, let the current time since the beginning of the trip be tact. Then the fuel-optimal solution for the remainder of the trip from x to $D_M$, which retains the original arrival time at $D_M$, is obtained by finding $\tilde{T}_i T_j, j=i+1, \ldots M,$ which minimizes $$\tilde{F}_i(\tilde{T}_i, x, v) + \sum_{j=i+1}^{M} F_j(T_j)$$

subject to $$t_{min}(i) \leq t_{act} + \tilde{T}_i \leq t_{max}(i) - \Delta t_i$$

$$t_{min}(k) \leq t_{act} + \tilde{T}_i + \sum_{j=i+1}^{k}(T_j + \Delta t_{j-1}) \leq t_{max}(k) - \Delta t_k$$

$$k = i+1, \ldots, M-1$$

$$t_{act} + \tilde{T}_i + \sum_{j=i+1}^{M}(T_j + \Delta t_{j-1}) = T$$

Here, $\tilde{F}_i(t,x,v)$ is the fuel-used of the optimal trip from x to $D_i$, traveled in time t, with initial speed at x of v.

As discussed above, an exemplary process to enable more efficient re-planning constructs the optimal solution for a stop-to-stop trip from partitioned segments. For the trip from $D_{i-1}$ to $D_i$, with travel time $T_i$, choose a set of intermediate points $D_{ij}$, j=1, ..., $N_i$−1. Let $D_{i0}=D_{i-1}$ and $D_{iN_i}=D_i$. Then express the fuel-use for the optimal trip from $D_{i-1}$ to $D_i$ as $$F_i(t) = \sum_{j=1}^{N_i} f_{ij}(t_{ij} - t_{i,j-1}, v_{i,j-1}, v_{ij})$$

where $f_{ij}(t, v_{i,j-1}, v_{ij})$ is the fuel-use for the optimal trip from $D_{i,j-1}$ to $D_{ij}$, traveled in time t, with initial and final speeds of $v_{i,j-1}$ and $v_{ij}$. Furthermore, $t_{ij}$ is the time in the optimal trip corresponding to distance $D_{ij}$. By definition, $t_{iN_i} - t_{i0} = T_i$. Since the train is stopped at $D_{i0}$ and $D_{iN_i}$, $v_{i0} = v_{iN_i} = 0$.

The above expression enables the function Fi(t) to be alternatively determined by first determining the functions $f_{ij}(\cdot)$, $1 \leq j \leq N_i$, then finding $\tau_{ij}$, $1 \leq j \leq N_i$ and $v_{ij}$, $1 \leq j < N_i$, which minimize $$F_i(t) = \sum_{j=1}^{N_i} f_{ij}(\tau_{ij}, v_{i,j-1}, v_{ij})$$

subject to $$\sum_{j=1}^{N_i} \tau_{ij} = T_i$$

$$v_{min}(i, j) \le v_{ij} \le v_{max}(i, j) \quad j = 1, \ldots, N_i - 1$$

$$v_{i0} - v_{iN_i} = 0$$

By choosing $D_{ij}$ (e.g., at speed restrictions or meeting points), $v_{max}(i, j) - v_{min}(i, j)$ can be minimized, thus minimizing the domain over which $f_{ij}(\ )$ needs to be known.

Based on the partitioning above, a simpler suboptimal re-planning approach than that described above is to restrict re-planning to times when the train is at distance points $D_{ij}$, $1 \le i \le M$, $1 \le j \le N_i$. At point $D_{ij}$, the new optimal trip from $D_{ij}$ to $D_M$ can be determined by finding $\tau_{ik}$, $j<k \le N_i$, $v_{ik}$, $j<k<N_i$, and $\tau_{mn}$, $i<m \le M$, $1 \le n \le N_m$, $v_{mn}$, $i<m \le M$, $1 \le j<N_m$, which minimize $$\sum_{k=j+1}^{N_i} f_{ik}(\tau_{ik}, v_{i,k-1}, v_{ik}) + \sum_{m=i+1}^{M} \sum_{n=1}^{N_m} f_{mn}(\tau_{mn}, v_{m,n-1}, v_{mn})$$

subject to $$t_{min}(i) \le t_{act} + \sum_{k=j+1}^{N_i} \tau_{ik} \le t_{max}(i) - \Delta t_i$$

$$t_{min}(n) \le t_{act} + \sum_{k=j+1}^{N_i} \tau_{ik} + \sum_{m=i+1}^{n} (T_m + \Delta t_{m-1}) \le t_{max}(n) - \Delta t_n$$

$$n = i+1, \ldots, M-1$$

$$t_{act} + \sum_{k=j+1}^{N_i} \tau_{ik} + \sum_{m=i+1}^{M} (T_m + \Delta t_{m-1}) = T$$

where $$T_m = \sum_{n=1}^{N_m} \tau_{mn}$$

A further simplification is obtained by waiting on the re-computation of $T_m$, $i<m \le M$, until distance point $D_i$ is reached. In this way, at points $D_{ij}$ between $D_{i-1}$ and $D_i$, the minimization above needs only be performed over $\tau_{ij}$, $j<k \le N_i$, $v_{ik}$, $j<k<N_i$. $T_i$ is increased as needed to accommodate any longer actual travel time from $D_{i-1}$ to $D_{ij}$ than planned. This increase is later compensated, if possible, by the re-computation of $T_m$, $i<m \le M$, at distance point $D_i$.

With respect to the closed-loop configuration disclosed elsewhere herein, the total input energy required to move a train 31 from point A to point B consists of the sum of four components, specifically difference in kinetic energy between the points A and B; difference in potential energy between the points A and B; energy loss due to friction and other drag losses (wheel frictional forces generated on track curves and as the train passes through track switches); and energy dissipated by the application of the brakes. Assuming the start and end speeds are equal (e.g., stationary) the first component is zero. Furthermore, the second component is independent of driving strategy. Thus, it suffices to minimize the sum of the last two components.

Following a constant speed profile minimizes drag loss. Following a constant speed profile also minimizes total energy input when braking is not needed to maintain constant speed. However, if braking is required to maintain constant speed, applying braking just to maintain constant speed will most likely increase total required energy because of the need to replenish the energy dissipated by the brakes. A possibility exists that some braking may actually reduce total energy usage if the additional brake loss is more than offset by the resultant decrease in drag loss caused by braking, by reducing speed variation.

After completing a re-plan from the collection of events described above, the new optimal notch/speed plan can be followed using the closed loop control described herein. However, in some situations there may not be enough time to carry out the segment-decomposed planning described above, and particularly when there are critical speed restrictions that must be respected, an alternative may be preferred. Examples of the present invention accomplish this with an algorithm referred to as "smart cruise control." The smart cruise control algorithm is an efficient process for generating, on the fly, an energy-efficient (hence fuel-efficient) sub-optimal prescription for driving the train 31 over a known terrain. This algorithm assumes knowledge of the position of the train 31 along the track 34 at all times, as well as knowledge of the grade, switch locations, and curvature of the track versus position. The method relies on a point-mass model for the motion of the train 31, whose model parameters may be adaptively estimated from online measurements of train motion as described earlier.

The smart cruise control algorithm has three principal components, specifically, a modified speed limit profile that serves as an energy-efficient guide around speed limit reductions; an ideal throttle or dynamic brake setting profile that attempts to balance minimizing speed variations and braking; and a mechanism for combining the latter two components to produce a notch command, employing a speed feedback loop to compensate for mismatches of modeled parameters when compared to reality parameters. Smart cruise control can accommodate strategies in examples of the present invention without active braking (e.g., the driver is signaled and assumed to provide the requisite braking) or a variant that does provide active braking.

With respect to a cruise control algorithm that does not control dynamic braking, the three exemplary components are a modified speed limit profile that serves as an energy-efficient guide around speed limit reductions, a notification signal to notify the operator when braking should be activated, an ideal throttle profile that attempts to balance minimizing speed variations and notifying the operator to apply brakes and a mechanism employing a feedback loop to compensate for mismatches of model parameters to reality parameters.

Also included in embodiments of the trip optimizer system is an approach to identify key parameter values of the train 31. For example, with respect to estimating train mass, a Kalman filter and a recursive least-squares approach may be utilized to detect errors that may develop over time.

FIG. 7 is a schematic diagram, showing information flow between elements, of an embodiment of the trip optimizer system. As discussed elsewhere herein, a remote facility, such as a dispatch center 60 can provide information for use by examples of the present invention. As illustrated, such information is provided to an executive control element 62. Also supplied to the executive control element 62 is information from a locomotive modeling information database 63 (including, for example, estimated train parameters such as, but not limited to, train weight and drag coefficients), information from a track information database 36 (including, for example, track grade information, track curve information, track switch locations, and speed limit information), and fuel rate tables from a fuel rate estimator 64.

The executive control element 62 supplies information to the trip/mission planner 12, which is disclosed in more detail in conjunction with FIG. 1. Once a trip plan has been calculated, the plan is supplied to a driving advisor, driver/operator, or other controller element 51. The trip plan is also supplied to the executive control element 62 so that it can compare the trip when other new data is provided.

As discussed above, the driving advisor 51 (controller element) can automatically set a notch power, either a pre-established notch setting or an optimum continuous notch power value. In addition to supplying a speed command to the locomotive 31, a display 68 is provided so that the operator can view what the planner has recommended. The operator also has access to a control panel/stand 69. Through the control panel 69 the operator can decide whether to apply the notch power recommended. Towards this end, the operator may limit a targeted or recommended power. That is, at any time the operator always has final authority over the power setting for operation of the locomotive consist, including whether to apply brakes if the trip plan recommends slowing the train 31. For example, if operating in dark territory, or where information from wayside equipment cannot electronically transmit information to a train and instead the operator views visual signals from the wayside equipment, the operator inputs commands based on information contained in the track database and visual signals from the wayside equipment. Based on how the train 31 is functioning, information regarding fuel measurement is supplied to the fuel rate estimator 64. Since direct measurement of fuel flows is not typically available in a locomotive consist, estimations of fuel consumed to a point in the trip and projections into the future if the optimal plans are followed use calibrated physics models, such as those used in developing the optimal plans. For example, such predictions may include, but are not limited to, the use of measured gross horsepower and known fuel characteristics to derive the cumulative fuel used.

The train 31 also has a locator device/element 30 such as a GPS receiver or sensor, as discussed elsewhere herein. Information is supplied to the train parameters estimator 65. Such information may include, but is not limited to, GPS sensor data, tractive/braking effort data, braking status data, speed and any changes in speed data. With information regarding grade, curve, switch, and speed limit information, train weight and drag coefficients information is supplied to the executive control element 62.

Embodiments of the trip optimizer system may also allow for the use of continuously variable power throughout the optimization planning and closed loop control implementation. In a conventional locomotive, power is typically quantized to eight discrete levels. Modern locomotives can realize continuous variation in horsepower that may be incorporated into the previously described optimization methods. With continuous power, the locomotive 42 can further optimize operating conditions, e.g., by minimizing auxiliary loads and power transmission losses, and fine tuning engine horsepower to regions of optimum efficiency or to points of increased emissions margins. Example include, but are not limited to, minimizing cooling system losses, adjusting alternator voltages, adjusting engine speeds, and reducing number of powered axles. Further, the locomotive 42 may use the on-board track database 36 and the forecasted performance requirements to minimize auxiliary loads and power transmission losses to provide optimum efficiency for the target fuel consumption/emissions. Examples include, but are not limited to, reducing a number of powered axles on flat terrain and pre-cooling the locomotive engine prior to entering a tunnel.

The trip optimizer system may also use the on-board track database 36 and the forecasted performance to adjust the locomotive performance, such as to ensure that the train has sufficient speed as it approaches a hill and/or tunnel. For example, this could be expressed as a speed constraint at a particular location that becomes part of the optimal plan generation created by solving the equation (OP). Additionally, the trip optimizer system may incorporate train-handling rules, such as, but not limited to, tractive effort ramp rates and braking effort ramp rates. These may be incorporated directly into the formulation for optimum trip profile or alternatively incorporated into the closed loop regulator used to control power application to achieve the target speed.

In one embodiment, the trip optimizer system is installed only on a lead locomotive of the train consist. Even though embodiments of the present invention are not dependent on data or interactions with other locomotives, it may be integrated with a consist manager, as disclosed in U.S. Pat. No. 6,691,957 and U.S. Pat. No. 7,021,588 (both owned by the Assignee and both incorporated by reference), and/or a consist optimizer functionality to improve efficiency. Interaction with multiple trains is not precluded, as illustrated by the example of dispatch arbitrating two "interdependently optimized" trains described herein.

Embodiments of the trip optimizer system may be used with consists in which the locomotives are not contiguous, e.g., with one or more locomotives up front, and others in the middle and at the rear for train. Such configurations are called "distributed power," wherein the standard connection between the locomotives is replaced by radio link or auxiliary cable to link the locomotives externally. When operating in distributed power, the operator in a lead locomotive can control operating functions of remote locomotives in the consist via a control system, such as a distributed power control element. In particular, when operating in distributed power, the operator can command each locomotive consist to operate at a different notch power level (or one consist could be in motoring and other could be in braking) wherein each individual in the locomotive consist operates at the same notch power.

Trains with distributed power systems can be operated in different modes. In one mode all locomotives in the train operate at the same notch command. If the lead locomotive is commanding motoring at notch N8, all units in the train are commanded to generate motoring at notch N8. In an "independent" control mode, locomotives or sets of locomotives distributed throughout the train can be operated at different motoring or braking powers. For example, as a train crests a mountaintop, the lead locomotives (on the down slope of mountain) may be placed in braking mode, while the locomotives in the middle or at the end of the train (on the up slope of mountain) may be in motoring. This is done to minimize tensile forces on the mechanical couplers that connect the railcars and locomotives.

Traditionally, operating the distributed power system in "independent" mode requires the operator to manually command each remote locomotive or set of locomotives via a display in the lead locomotive. Using the physics-based planning model, train set-up information, on-board track database, on-board operating rules, location determination system, real-time closed loop power/brake control, and sensor feedback, the system can automatically operate the distributed power train in "independent" mode.

When operating in distributed power, the operator in a lead locomotive can control operating functions of remote locomotives in the remote consists via a control system, such as a distributed power control element. Thus when operating in distributed power, the operator can command each locomotive consist to operate at a different notch power level (or one consist could be in motoring and other could be in braking) wherein each individual locomotive in the locomotive consist operates at the same notch power. In an exemplary embodiment, with the trip optimizer system installed on the train and in communication with the distributed power control element, when a notch power level for a remote locomotive consist is desired as recommended by the optimized trip plan, the trip optimizer system communicates this power setting to the remote locomotive consists for implementation. As discussed below, brake applications are similarly implemented.

When operating with distributed power, the optimization problem previously described can be enhanced to allow additional degrees of freedom, in that each of the remote units can be independently controlled from the lead unit. This offers an important feature in that additional objectives or constraints relating to in-train forces may be incorporated into the performance function, assuming a model to reflect the in-train forces is also included. Thus, embodiments of the present invention may include the use of multiple throttle controls to better manage in-train forces as well as fuel consumption and emissions.

In a train utilizing a consist manager, the lead locomotive in a locomotive consist may operate at a different notch power setting than other locomotives in that consist. The other locomotives in the consist operate at the same notch power setting. The trip optimizer system may be utilized in conjunction with the consist manager to command notch power settings for the locomotives in the consist. Thus, based on commands received from the trip optimizer system, since the consist manager divides a locomotive consist into two groups, lead locomotive and trailing units, the lead locomotive will be commanded to operate at a certain notch power and the trail locomotives can be commanded to operate at a different notch power. In an exemplary embodiment, the distributed power control element may be the system and/or apparatus where this operation is performed.

Likewise, when a consist optimizer is used with a locomotive consist, the trip optimizer system can be used in conjunction with the consist optimizer to determine notch power for each locomotive in the locomotive consist. For example, suppose a trip plan recommends a notch power setting of four for the locomotive consist. Based on the location of the train, the consist optimizer will take this information and then determine the notch power setting for each locomotive in the consist. In this implementation, the efficiency of setting notch power settings over intra-train communication channels is improved. Furthermore, as discussed above, implementation of this configuration may be performed utilizing the distributed control system.

Furthermore, as discussed previously, the trip optimizer system may be used for continuous corrections and re-planning with respect to when the train consist uses braking based on upcoming items of interest, such as, but not limited to, railroad crossings, grade changes, approaching sidings, approaching depot yards, and approaching fuel stations where each locomotive in the consist may require a different braking option. For example, if the train is coming over a hill, the lead locomotive may have to enter a braking condition, whereas the remote locomotives, having not reached the peak of the hill, may have to remain in a motoring state.

Figure 8:
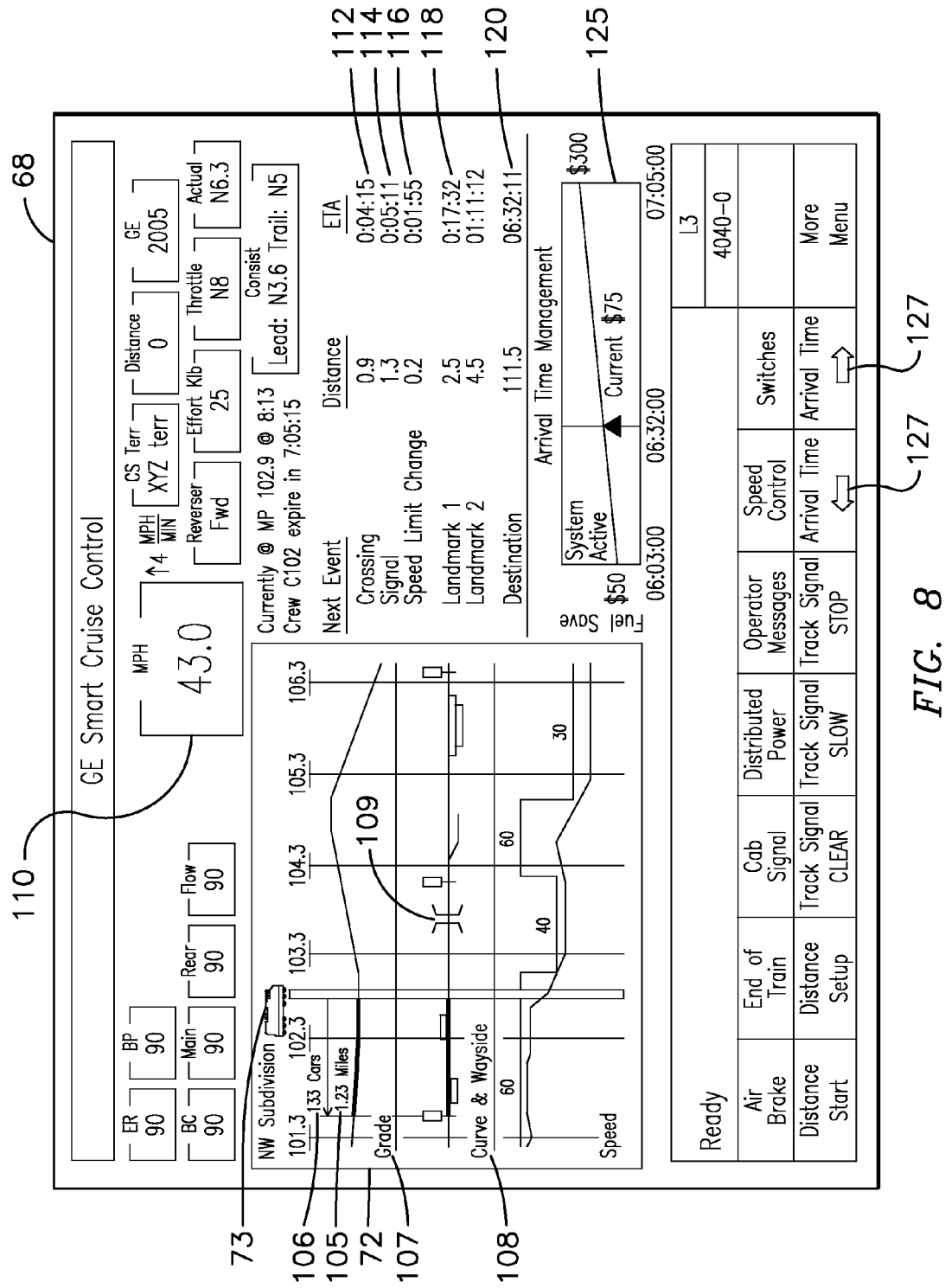
FIG. 8 depicts an exemplary embodiment of a dynamic display for use by the operator.
Figure 9:
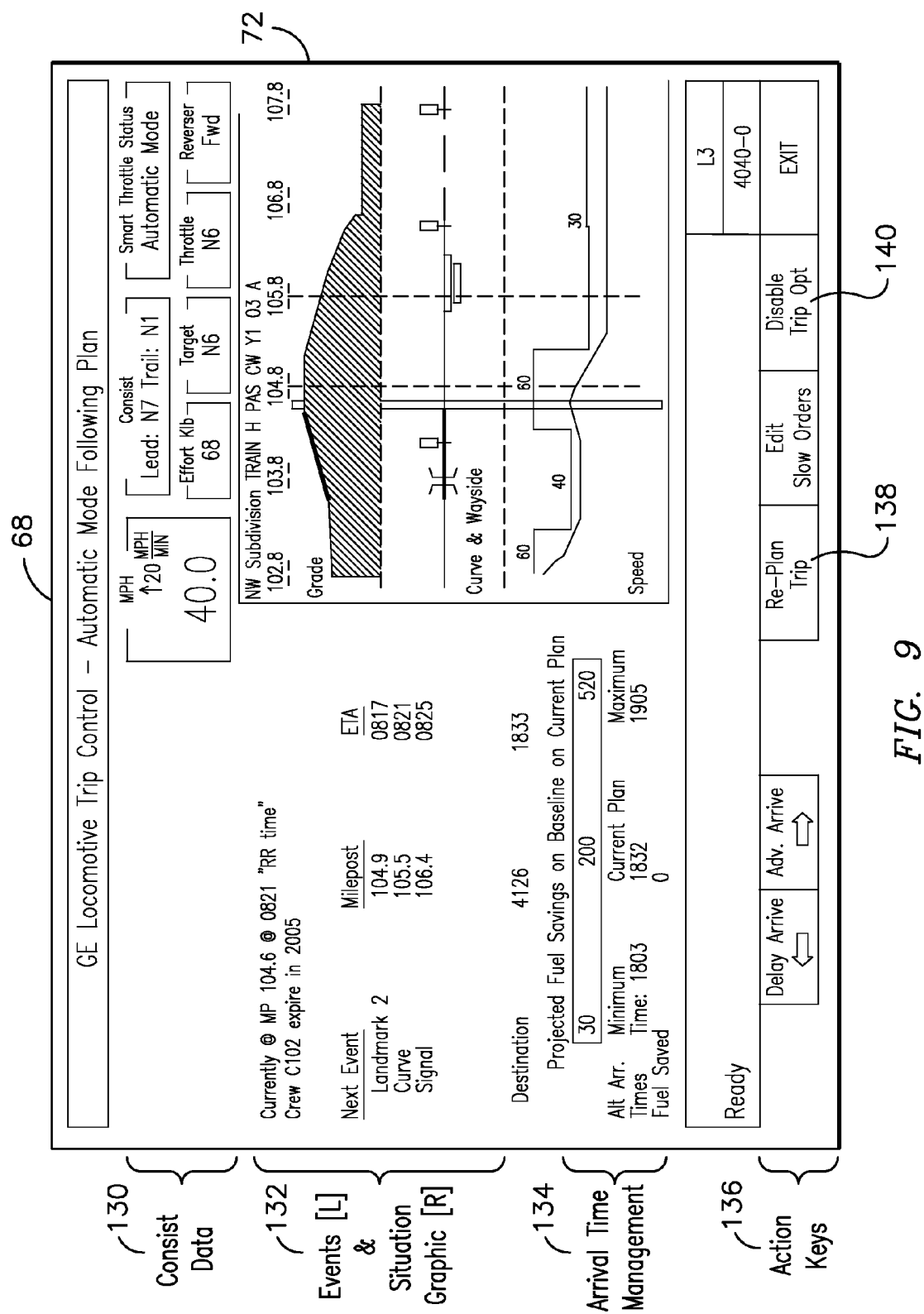
FIG. 9 depicts another exemplary embodiment of a dynamic display for use by the operator.
Figure 10:
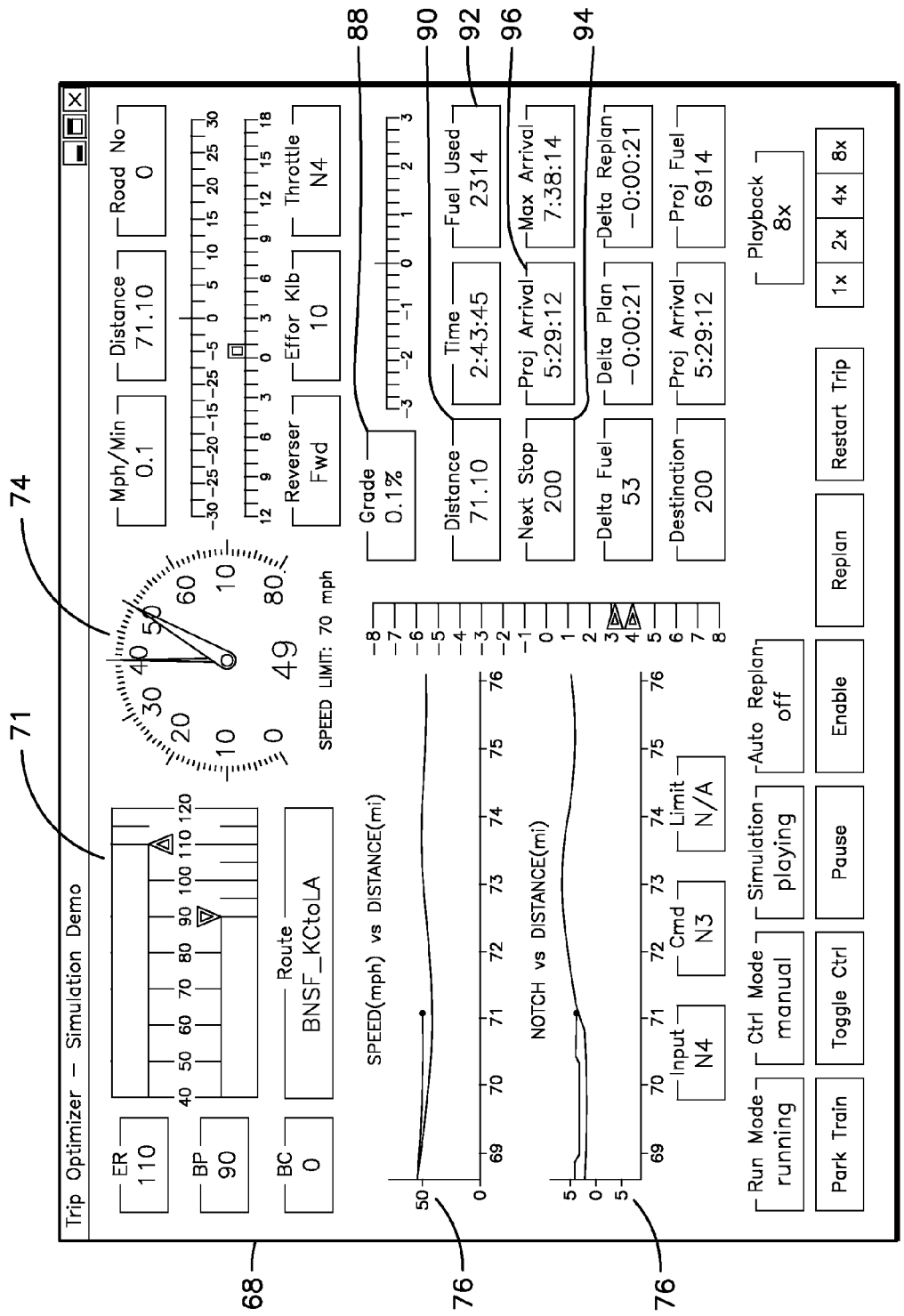
FIG. 10 depicts another exemplary embodiment of a dynamic display for use by the operator.

FIGS. 8, 9, and 10 are illustrations of dynamic displays for use by the operator, according to various embodiments of the present invention. As shown in FIG. 8, a trip profile 72 may be provided as part of the dynamic display. Within the profile a location 73 of the locomotive is indicated. Such information as train length 105 and the number of cars 106 in the train is provided. Elements are also provided regarding track grade 107, curve, switches and wayside elements 108, including bridge location 109 and train speed 110. The display 68 allows the operator to view such information and also see where the train is along the route. Information pertaining to distance and/or estimated time of arrival to such locations as crossings 112, signals 114, speed changes 116, landmarks 118 and destinations 120 is provided. An arrival time management tool 125 is also provided to allow the user to determine the fuel savings realized during the trip. The operator has the ability to vary arrival times 127 and witness how this affects the fuel savings, wear on the train wheels, wear on the track, and wear on any other infrastructure equipment. As discussed herein, those skilled in the art will recognize that fuel saving is an exemplary example of only one objective that can be reviewed with a management tool. Thus, depending on the parameter being viewed, other parameters, discussed herein can be viewed and evaluated with a management tool visible to the operator. The operator is also provided with information regarding the time duration that the crew has been operating the train. In exemplary embodiments, time and distance information may either be illustrated as the time and/or distance until a particular event and/or location or it may provide a total elapsed time.

As illustrated in FIG. 9, an exemplary display provides information about consist data 130, an events and situation graphic 132, an arrival time management tool 134, and action keys 136. Similar information as discussed above is provided in this display as well. This display 68 also provides action keys 138 to allow the operator to re-plan as well as to disengage 140 the trip optimizer system.

FIG. 10 depicts another exemplary embodiment of the display. Typical information for a modern locomotive including air-brake status 72, analog speedometer with digital inset 74, and information about tractive effort in pounds force (or traction amps for DC locomotives) is visible. An indicator 74 shows the current optimal speed in the plan being executed as well as an accelerometer graphic to supplement the readout in mph/minute. Important new data for optimal plan execution is in the center of the screen, including a rolling strip graphic 76 with optimal speed and notch setting versus distance compared to the current history of these variables. In this exemplary embodiment, location of the train is derived using the locator element. As illustrated, the location is provided by identifying how far the train is away from its final destination, an absolute position, an initial destination, an intermediate point, and/or an operator input.

The strip chart provides a look-ahead to changes in speed required to follow the optimal plan, which is useful in manual control and monitors plan versus actual during automatic control. As discussed herein, such as when in the coaching mode, the operator can either follow the notch or speed suggested by an example of the present invention. The vertical bar gives a graphic of desired and actual notch, which are also displayed digitally below the strip chart. When continuous notch power is utilized, as discussed above, the display will simply round to closest discrete equivalent. The display may be an analog display, wherein an analog equivalent or a percentage or actual horse power/tractive effort is displayed.

Critical information on trip status is displayed on the screen and shows the current grade the train is encountering 88, either by the lead locomotive, a location elsewhere along the train or an average over the train length. A cumulative distance traveled in the plan 90, cumulative fuel used 92, the location of or the distance to the next stop as planned 94 and current and projected arrival time 96 at the next stop are also disclosed. The display 68 also shows the maximum possible time to destination with the computed plans available. If a later arrival is required, a re-plan is executed. Delta plan data shows status for fuel and schedule ahead or behind the current optimal plan. Negative numbers mean less fuel or early arrival compared to plan, positive numbers mean more fuel or late arrival compared to plan. Typically, these parameters trade-off in opposite directions (e.g., slowing down to save fuel makes the train late and conversely).

At all times, these displays 68 give the operator a snapshot of the trip status with respect to the currently instituted driving plan. This display is for illustrative purpose only as there are many other ways of displaying/conveying this information to the operator and/or dispatch. Towards this end, any other items of information disclosed above can be added to the display to provide a display that is different than those shown in the drawings.

Other features that may be included in the trip optimizer system include, but are not limited to, generating data logs and reports. This information may be stored on the train and downloaded to an off-board system. The downloads may occur via manual and/or wireless transmission. This information may also be viewable by the operator via the locomotive display. The data may include such information as, but not limited to, operator inputs, time system is operational, fuel saved, fuel imbalance across locomotives in the train, wheel wear, track wear, train journey off course, and system diagnostic issues, such as a GPS sensor malfunction.

Since trip plans must also take into consideration allowable crew operation time, embodiments of the present invention may take such information into consideration as a trip is planned. For example, if the maximum time a crew may operate is eight hours, then the trip can be fashioned to include a stopping location for a new crew to replace the present crew. Such specified stopping locations may include, but are not limited to, rail yards, meet/pass locations, and the like. If, as the trip progresses, the trip time may be exceeded, the trip optimizer system may be overridden by the operator to meet other criteria as determined by the operator. Ultimately, regardless of the operating conditions of the train (such as high load, low speed, train stretch conditions, etc.), the operator remains in control to command a safe speed and/or operating condition of the train.

Using the trip optimizer system, the train may operate in a plurality of different operational concepts/manners. In one operational concept, the trip optimizer system provides commands for commanding propulsion and dynamic braking. The operator handles all other train functions. In another operational concept, the trip optimizer system provides commands for commanding propulsion only. The operator handles dynamic braking and all other train functions. In yet another operational concept, the trip optimizer system provides commands for commanding propulsion, dynamic braking, and application of the airbrake. The operator handles all other train functions.

The trip optimizer system may also notify the operator of upcoming items of interest or actions to be taken, such as forecasting logic of an example of the present invention, the continuous corrections and re-planning to the optimized trip plan, the track database. The operator can also be notified of upcoming crossings, signals, grade changes, brake actions, sidings, rail yards, fuel stations, etc. These notifications may occur audibly and/or through the operator interface.

Specifically, using the physics based planning model, train set-up information, on-board track database, on-board operating rules, location determination system, real-time closed loop power/brake control, and sensor feedback, the trip optimizer system presents and/or notify the operator of required actions. The notification can be visual and/or audible. Examples include notification of crossings that require the operator to activate the locomotive horn and/or bell and "silent" crossings that do not require the operator to activate the locomotive horn or bell.

In another exemplary embodiment, using the physics based planning model discussed above, train set-up information, on-board track database, on-board operating rules, location determination system, real-time closed loop power/brake control, and sensor feedback, the trip optimizer system may present the operator information (e.g., a gauge on display) that allows the operator to see when the train will arrive at various locations, as illustrated in FIG. 9. The system allows the operator to adjust the trip plan (target arrival time). This information (actual estimated arrival time or information needed to derive same off-board) can also be communicated to the dispatch center to allow the dispatcher or dispatch system to adjust the target arrival times. This allows the system to quickly adjust and optimize for the appropriate target function (for example trading off speed and fuel usage).

Based on the information provided above, the trip optimizer system may be used to determine a location of the train 31 on a track, step 18 (see FIG. 1). A determination of the track characteristic (e.g., curve radius and switches) may also be accomplished, such as by using the train parameter estimator 65. A trip plan may be created based on the location of the train, the characteristic of the track, the desire to minimize wear, and an operating condition of at least one locomotive of the train. Furthermore, an optimal power setting may be communicated to the train operator, who is directed to operate the locomotive, locomotive consist, and/or train in accordance with the optimal power setting. In another example, instead of directing/coaching the train operator, the train 31, locomotive consist 18, and/or locomotive may be automatically operated based on the optimal power setting.

Additionally, the method implemented by the trip optimizer system may also involve determining a power setting, or power commands 14, for the locomotive consist 18 based on the trip plan. The locomotive consist 18 is then operated at the power setting. Operating parameters of the train and/or locomotive consist may be collected, such as, but not limited to, actual speed of the train, actual power setting of the locomotive consist, and a location of the train. Certain of these parameters can be compared to a power setting the locomotive consist is commanded to operate at. In another embodiment, the method implemented by the trip optimizer system may involve determining actual operating parameters of the train and/or locomotive consist. The determined parameter is compared to the desired operating parameter. If a difference is detected, the trip plan is adjusted, as at step 24 in FIG. 1. Actual values of mission performance components (e.g., fuel consumption) can also be determined and compared to desired values of the mission performance component.

Again, the trip plan can be adjusted if warranted by a difference between the actual value and the desired value.

Another embodiment may entail a method where a location of the train 31 on the track 34 is determined. A characteristic of the track 34 (such as the track curvature or the location of track switches) is also determined. A trip plan is generated in order to minimize wheel and/or track wear. Train acceleration and deceleration are reduced as the train approaches or traverses track curves and track switches to reduce forces exerted by the wheels on the track and in this way reduce wheel and/or track wear. The trip plan may be generated based on the location of the train, the characteristic of the track, and/or the operating condition of the locomotive consist 18 and/or train 31. In a similar method, once a location of the train is determined on the track and a characteristic of the track is known, propulsion control and/or notch commands are provided to minimize fuel consumption, emissions, other equipment wear, or to limit wheel and/or track wear.

Though the description herein discloses database augmentation performed with respect to the trip optimizer system, utilizing database augmentation with trip optimization is not necessarily required. Thus, an optimized mission plan does not need to be updated based on an augmented database. Instead, the augmented database may be used to optimize future trip plans.

As described above, the trip optimizer system uses track and/or train (herein track/train) information (in one embodiment stored within the database 63 of FIG. 7) to plan the optimized trip over individual track segments, collectively forming an optimized train trip over a track path comprising several track segments. The trip optimizer system determines a train speed trajectory and in a closed-loop embodiment controls the train according to that trajectory. Alternatively, the trip optimizer system advises the train operator of the desired optimal speed trajectory during the trip and permits the operator to control the train according to the presented trajectory. However, the operator may be aware of operational conditions that motivate him to deviate from the presented optimal trajectory.

According to one embodiment of the present invention, the track database information, comprising elements characterizing the track, is updated and incorporated into the plan adjustment process (as represented by the block 26 of FIG. 1) and/or incorporated into the re-plan process (as represented by the block 24 of FIG. 1) to improve the optimization results. The adjusted plan (or the new plan) improves the locomotive's fuel efficiency (or another performance parameter that is optimized by the trip optimizer system, such as wheel and track wear) to realize an operational benefit or savings for the train or the railroad network.

In addition to curve radii and track switches, track characterizing information comprises allowed speed, speed restrictions, track grade, track age, track condition, weather conditions, and the like, further including any track information that affects the ability to propel the locomotive or stop the locomotive (e.g., track friction coefficient) on the track.

Train data may also be stored in the database 63. For example, the tractive effort and braking effort applied by the train as it traverses a track segment can be determined and stored in the database 63 for use by the trip optimizer system to generate the speed trajectory. For example, if a train slows at a particular location on the track due to a track problem, the trip optimizer system can accordingly slow the train in the same region during subsequent trips over the affected track segment. The trip optimizer system thereby creates a plan that is more realistic and in accordance with actual train operations along the track segment. Alternatively, the trip optimizer system may take this into account and plan the trip accordingly, or correct the track database for the future applications.

After the track problem is resolved, a train traversing the affected track will determine that the problem has been resolved, update its database accordingly, and supply the updated track information to other trains scheduled to traverse the track segment and/or to a remote central repository from where the updated track information can be used in generating optimized trip plans for other trains. The trip optimizer system can then optimize travel over that track segment without the constraint caused by the damaged track.

According to an exemplary embodiment of the present invention, updated or more recent track characterizing information is stored in the database 63 and supplied to the trip optimizer system to update and improve the accuracy of the track database. For example, track altitude information stored in the database 63 may include an actual altitude measurement at a predetermined occurrence, such as, but not limited to, a specific distance such as every mile, every point the grade changes, and/or every time track curvature changes, with altitude values interpolated between two successive altitude data points. To improve the accuracy of the altitude information and avoid the interpolated estimates, according to one embodiment of the invention, location information, such as determined using GPS data including both a geographical location and the altitude at the location, is determined and provided to the database 63. This information can be collected in real time as the train traverses a track segment and uploaded directly to the database 63. The information can also be collected by train personnel (track maintenance personnel, for example) and provided to a central repository for eventual uploading to the database 63 or provided to any database from which the trip optimizer system extracts track information to compute the optimal trip trajectory. The improved altitude information should generate a more accurate and therefore more efficient speed trajectory, improving the train's fuel efficiency.

In another embodiment of the invention, various sensors mounted on a locomotive or railcar (or the end-of-train device) sense these track-related conditions and provide data relative to the sensed conditions for storing in the database 63. For example, a video or still camera mounted on the locomotive collects track data for later analysis and interpretation. Results of the analysis are uploaded to the database 63 of any trains traversing the track segment.

Updated track information can be used locally, e.g., by the train collecting the information, to revise the executing trip plan in real time. The information can also be uploaded to other trains or to a central repository for use in conjunction with optimized trip plans for other trains that will later traverse the track segment.

Updated information supplied by multiple trains traversing the track segment can be aggregated for use in creating future trip plans. The aggregate data can also be analyzed for trends or probable conditions. For example, if the track information indicates certain likely weather conditions over a specific time interval for a specific track segment, the trip optimizer system can consider the effects of these weather/seasonal conditions when creating trip plans for that track segment during the specified time interval. Notwithstanding that weather conditions may differ from the expected condition when a train actually traverses the track segment, the trip optimizer has optimized the majority of the trips over that segment during the time interval of interest.

In another embodiment, the tractive effort, braking effort, inertia, and/or speed are used to determine the track grade. In any notch position (including notch idle position), the rate of change of the train's speed is affected by drag and track grade. To determine the track grade, the rate of change of speed is determined and compared with the expected change in speed. A mismatch indicates that the assumed track grade is not correct.

The mismatch may be confirmed with multiple trains traversing the track segment for statistical significance, and to make sure an error is not due to estimation errors, sensor errors, or other noise parameters, like wind/drag. Any deviation from what is expected/projected may mean that either the assumed train parameters (weight, drag, length, etc.) and/or track parameters (grade, curvature, etc.) are not correct. The train parameters, if assumed incorrectly, will generally manifest throughout the trip or a significant portion of the trip; whereas track parameter mismatches will usually manifest only at the points of mismatch. Determining the train parameter mismatch can enhance train performance during the rest of trip performance or can be used to correct future trips if there is a consistent mismatch. Whenever a train parameter error is determined it can be used for the rest of the trip. However, if the drag coefficient, for example, assumed for all the trains of a particular type, is in error, then the future plans for every train of that type can be corrected.

An inertia value can be assumed constant throughout a trip, and therefore train performance information can confirm whether the inertia value is correct. The assumed inertia can be used for the track grade calculations. For example, every time there is tractive effort change, the corresponding acceleration change determines the inertia of the train (assuming there is no grade change at the same time there is a tractive effort change). Moreover, the effect of a grade change has a gradual effect on the train acceleration since the weighted average grade drives the acceleration changes. For example, the tractive effort change can be observed at every notch change, and since multiple observations can be made, the effect of grade and drag changes can be averaged out to zero. Once the inertia is known, the grade can be determined based on the deviation of acceleration from the expected acceleration assuming that the drag coefficient has not changed at the same time. Similarly, the assumed drag value can be compared with operation before and after the point of interest. The assumed drag value can be also determined from many trains traversing the same segment.

In another example, multiple trains traversing the track may all encounter unexpected wheel slip. Analysis of the collected data may indicate a failed track lubricating system. The trip optimizer system can include this slip condition in its trip plan. When the lubricating system is repaired, later trains traversing the track will not indicate an excessive wheel slip. The track database can be updated accordingly, responsive to which the trip optimizer system removes the unexpected slip condition from the trip planning process. Similarly, data about weather conditions that may affect travel time may be collected. The trip optimizer system may include weather conditions in its trip plan. Once the weather conditions change or improve, the track database can be updated and the trip optimizer system removes that condition from the trip planning process.

For those locomotives equipped with a signal sensing system, signal information for track blocks ahead of the present track block can also be provided to the trip optimizer system. Wayside equipment can also be used to determine and provide updated track information for the database 63. For example, wayside equipment can determine certain rail and train conditions (e.g., wheel bearing temperatures, number of railcars and axles in the train, wheel profile) and transmit this information to the train as it passes the wayside equipment. An end-of-train device can be equipped with sensors to determine track information and a communications device to supply the information to the database 63.

Train inertia, operator-applied tractive effort, operator-applied braking effort, locomotive speed, locomotive distance from a known location, barometric pressure, Loco-Cam™ video information (e.g., from a train-mounted video camera), and operator inputs over specific track segments can be stored in the database 63 and used by the trip optimizer system to improve the optimization process. The subject operating information can be collected by all trains traversing the track segment. Each train can provide the collected information to the database 63 for use by the trip optimizer system on the train.

Additionally, to allow other trains that may later traverse the track segment to have the advantage of this information, the collected information is uploaded to a database that all trains access or that the trip optimizer system accesses as it prepares optimized trip plans for trains traveling the track segment of interest. Although these additional inputs may not necessarily result in a more optimal solution trajectory, they will result in a more accurate trajectory vis-á-vis actual operator braking and tractive effort applications over the track segment of interest.

Certain collected train operational data, as described above, can be used directly by the trip optimizer system. For example, track altitude directly affects fuel consumption and can be used by the optimization system to more accurately determine fuel consumption and thereby optimize fuel consumption.

Certain track characteristics may be calculated from collected operational data, if actual measurement information is not available. These determined track characteristics are then used in the optimization process. For example, the measured power (tractive effort or notch position) and acceleration can be used to determine the track grade at a specific location on the track segment. The calculated grade is then used by the trip optimizer system.

Figure 11:
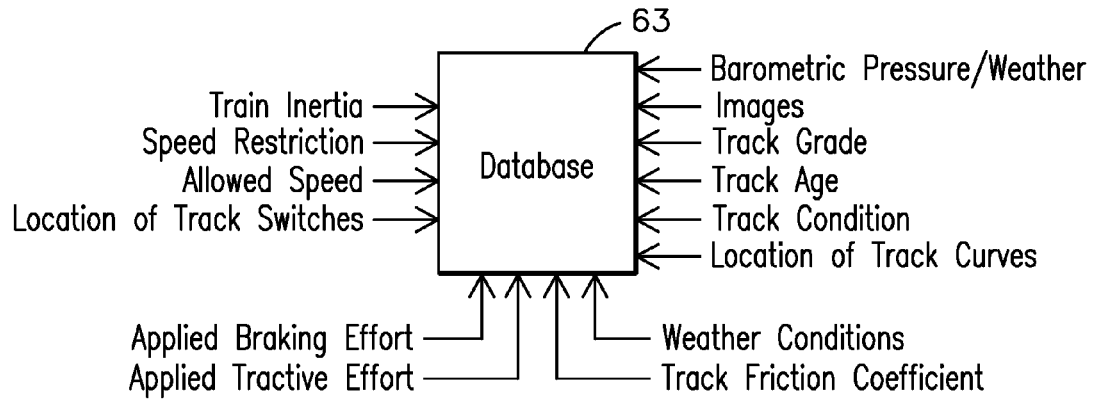
FIG. 11 depicts track database characteristics.

FIG. 11 illustrates track characterization information that can be provided while a train traverses the track segment. The track characterization information can be stored in a database onboard the locomotive 42 or supplied from the wayside location 41 to the locomotive 42. With the additional information provided, the trip optimizer system can more accurately depict the conditions the train will encounter over the track segment of interest and thereby produce a more realistic and efficient optimized speed trajectory. In particular, the plan can limit wheel and track wear. When track database 63 is updated according to the various methods described herein, the new data can be used for planning future trips over the track segment of interest and/or re-planning the current trip. A re-plan of the current trip may be especially important if there is a large discrepancy between one or more values used to initially plan the trip and a later determined value of that parameter.

Figure 12:
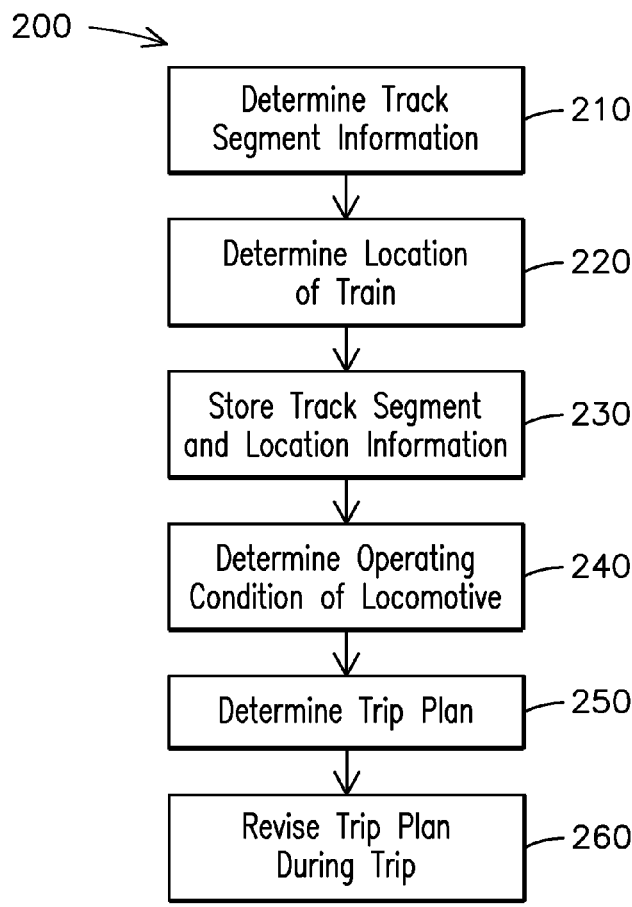
FIG. 12 is a flow chart of an exemplary method for operating a train during a trip along a track segment.

FIG. 12 illustrates a flow chart of exemplary steps for operating a train during a trip along a track segment. The method of flow chart 200 includes determining track segment information, step 210. A determination is made about a location of the train on a track or a time from a beginning of the trip at a step 220. The track segment and location information is stored, step 230. At least one operating condition of at least one of the locomotives is determined, step 240. At a step 250, a trip plan is created that is responsive to the location of the train, the track segment information, and at least one operating condition, to optimize locomotive/train performance in accordance with one or more operational criteria for the train.

The trip optimizer system and/or one or more of the methods discussed above may be used in creating the trip plan. The trip plan may be revised based on track segment information and/or train information collected during the trip, step 260. As discussed above, this method may be implemented using a computer software code.

Automatic reduction of train speed, acceleration, and deceleration are additional options to further reduce wear, including: wheel wear, rail wear, switch frog casting wear, impact fractures at grade railroad crossings, cast diamond wear and fractures, and drawbridge mitre rail wear and fractures. The aforementioned track components are especially vulnerable to wear, especially when a train traverses at high speed, and are difficult and expensive to replace. To extend the longevity of these components, railroads often impose a slower speed where these track components are located.

In addition to controlling the train speed, acceleration, and deceleration as described above, by controlling the application of tractive effort the trip optimizer system can control the train in buff (compression) or draught (tension) through curves and switches. These conditions directly affect the lateral wheel-to-rail force. Additional and more comprehensive control of the tension and compression forces is available when the trip optimizer system is also controlling the remote locomotives in a distributed power train independently from the lead locomotive(s). Including these forces as optimization parameters allows selective reduction of the lateral forces, and in addition to reducing curve wear, minimizes impacts to switch point rails and switch crossing frog castings. Reducing wear at these track locations reduces the probability of fractures and possible derailments.

In the embodiments described above, the trip optimizer system solves the problems of: (1) planning a mission of driving a given train over a given route (for example, specified by track grade and curvature vs. distance from an origin) to minimize fuel use (or another variable) subject to constraints on one or more of speed and travel time (e.g., use of a minimum amount of fuel or another target constraint); (2) executing the plan in real-time. In one embodiment the execution is performed with closed-loop feedback corrections to overcome modeling errors and unanticipated or poorly modeled external factors. For example, feedback correction may be required to limit train slack, which may not have been modeled in the trip plan, to limit in-train forces. In one embodiment, the closed-loop feedback control relates to the throttle applications only and relies on a control handoff to the driver when braking is required.

The enhanced concept according to another embodiment of the invention expands the objectives to be optimized, relaxes the restriction to throttle-only control, and enables traction and braking in both head-end locomotive trains and distributed power trains (the latter operating in independent mode or in synchronous mode). Using multiple factors beyond fuel consumption and travel time (pacing), tradeoffs between various factors are available and may be traded-off to blend a railroad's tactical objectives with strategic objectives on a given day for a given locomotive traveling over a given route. Trade-offs among fuel use, travel time, wear and tear of the infrastructure (e.g., elements of the locomotive, track and railcars, including track and wheel wear), cumulative emissions, etc., may have quantifiable value on any given day. With more complex objectives and available variations in train control, it is crucial to reduce dependence on operator judgment to achieve the objectives. Further, railroads want the flexibility to change the objectives as a function of class of service, fuel price, train and track conditions, and other operating factors.

Thus, a modified trip plan can include hard constraints, related to, for example, train speed limits, in-train longitudinal and lateral/vertical forces, wheel-rail forces to avoid derailment (where these forces and the wheel and rail conditions are determined by the railroad operator to avoid a derailment, and may be expressed as a physical limit, such as a force value or a wheel or rail dimension), instantaneous and cumulative emissions, and other locomotive operating parameters. In formulating the trip plan and operation of the train during the trip, the time to complete the trip may be taken as the minimum time possible or may be treated as a hard constraint at a value greater than the minimum time.

Subject to these constraints, any weighted or unweighted combination of instantaneous or cumulative objectives can be optimized, including fuel expended, emissions, and wheel and rail wear resulting from wheel-rail interactions. The trip optimizer system of this embodiment exploits train dynamic models and in response thereto determines a throttle and a brake setting. In addition to expanding the factors to be optimized, the invention allows flexible trade-offs among the factors, including travel time, fuel expended, emissions, and wear on the infrastructure, including the wheels and rail.

When applied to a distributed power train operating in synchronous mode, the trip optimizer system determines one common throttle or brake setting. When the distributed power train operates in independent mode (also referred to as front group/back group control where different throttle and brake settings can be determined for locomotives assigned to a front locomotive group and locomotives assigned to a back locomotive group), different independent throttle and brake settings can be determined for the front and the back group locomotives. The trip optimizer system can determine the throttle and brake settings as a function of location or distance along the track or other train operating parameters.

In a closed-loop embodiment, the trip optimizer system compensates for model inaccuracies, external factors (e.g., wind), and excessive transient coupler forces.

To embrace the broader performance objectives and add braking to the trip optimizer speed regulator requires consideration of several elements. An expanded physics model of the locomotive power consist and rolling stock operating over a defined track may be required. Reduced-order models of the power consist and train are used to approximate the maximum inter-train forces experienced, both for conventional power makeup (e.g., locomotives at the head-end of the train) and distributed makeup (e.g., two locomotives at the head-end of the train, one in the mid-train area and one at the rear of train).

The degree of optimization or performance improvement influences the need for the higher order models. In one exemplary embodiment, fuel consumption is more important than wheel and rail wear, in another exemplary embodiment all performance parameters are optimized together. Interactions between the individual optimization elements require higher order models to capture these interactions and adjust the train operation in when the trip plan is created or in real time.

The modeling process itself must also be considered, trading off modeling accuracy versus real time performance of the model. Model accuracy can also be adjusted. If the ratio of the predicted performance to the real time performance exceeds a predetermined threshold, then a higher order solution may be invoked for the remainder of the trip (or for at least portions of the trip). The selection of trip portions depends, again, on the desired performance improvements.

For any driving plan, modeling allows an approximate prediction of in-train forces based on throttle and braking actions. For distributed power trains these actions may be coordinated synchronously or independently. Dynamic braking actions may require minor model extensions from those described above. Energy calculations provide corresponding fuel usage and emissions produced based on transfer-functions (models) that correlate to consist power. A separate modeling framework provides a calculation of lateral forces and lateral/vertical ratios as functions of train speed, curvature, elevation, and super-elevation (tilt) of the track. A wear model based on the force-time history completes the physics modeling.

The lateral/vertical model also includes weight or wheel load. The wear model should also accommodate the railway's choice of rail size, profile type and the rail hardening process employed. In one embodiment these elements of the wear model are configurable by the railway. In another embodiment these elements are linked to an asset database that includes one of more of these elements. For example, in one model a higher velocity with resulting higher forces may be prioritized when running over manganese alloy rail or explosion-hardened rail and fixtures. A lower velocity and lower forces may be prioritized when running over untreated rails.

The optimization framework of the trip optimizer system is adapted to include the expanded physics modeling described above. In this extended trip optimizer system, the objectives may be setup as constraints or included in the objective to be optimized. For example, maximum lateral and in-train longitudinal forces may be included with speed restrictions as hard constraints, whereas fuel use, cumulative emissions and predicted wear can be setup as objectives to be minimized. Independent variables in the optimization vary from a single time sequence of throttle and dynamic brake with a fully synchronous setup, to multiple independent throttle/brake commands for a distributed power train. The output of the trip optimizer system is the sequence of throttle(s) and a common train speed that minimizes the objectives subject to the constraints. To execute the plan, either a speed regulator or a fully multi-variable dynamic regulator can be employed to track the plan and limit hard constraints on forces and speeds.

It is also possible to quantize wheel wear to an extent. Wear can be established over a long integration period by comparing the distance traveled, as predicted by the wheel diameter and the number of wheel revolutions, to a secondary location. The secondary location can also be determined by a distance-determining system, such as GPS. In this situation the effects of wheel slip/slide incidents are excluded. The slip/slide incidents occur when the tractive effort exceeds the rail adhesion.

Short term wheel wear is determined from short term speed variations on a per axle per rotation basis, as determined by an on-board axle speed encoder. These variations are due to wheel flat spots and wheels slipping too fast for compensation by the traction system. Additionally, other sensors such as an accelerometer can determine local wheel wear. Monitoring the traction motor current reflects traction torque and from this measurement one can determine wheel wear as reflected in repetitive changes in current/torque caused by changes in wheel flange performance, wheel flat spots, wheel axial movement, etc.

Returning to the trip optimizer system in a general or overall sense, another embodiment of the present invention relates to a method for controlling operations of a train. The method is also applicable to controlling other vehicles or other powered systems. According to the method, the train is controlled based on an optimized mission plan, for reducing fuel use, reducing emissions output, and/or reducing wheel wear, track wear, or wear on other components in the rail system. For calculating the mission plan, the following steps may be carried out. First, route data and train data is received, e.g., from a database or otherwise. The route data includes data relating to one or more characteristics of a track on which the train is to travel along a route and data relating to at least one speed limit along the route. The train data relates to one or more characteristics of the train.

The mission plan is created on-board the train at any time during travel of the train along the route. The mission plan is created at a first point along the route based on the received data, and covers at least a segment of the route extending to a second point further along the route than the first point. The mission plan is created for covering the entirety of the segment based on, and regardless of, the different geographic features or other characteristics of the route along the segment for which data is available. By this, it is meant: (i) the mission plan takes into consideration all the different geographic features or other characteristics of the route segment for which data is available, and (ii) the mission plan is created regardless of what particular geographic features or other characteristics of the route are along the segment. Thus, no matter what known geographic features or other route characteristics are along a route segment, a mission plan is created for that segment.

Another embodiment relates to a method for operating a vehicle. The method comprises receiving route data and vehicle data at the vehicle. The route data includes data relating to one or more characteristics of a route along which the vehicle travels, and the vehicle data relates to one or more characteristics of the vehicle. The method further comprises creating on-board the vehicle a mission plan at any time during travel of the vehicle along the route. The mission plan is created at a first point along the route based on the received data and covers at least a segment of the route extending to a second point further along the route than the first point. The mission plan is created for covering the entirety of the segment based on, and regardless of, all the different geographic features or other characteristics of the route along the segment for which data is available. The method further comprises controlling the vehicle according to the mission plan as the vehicle travels along the route segment. The mission plan is configured for reducing fuel use of the vehicle and/or reducing emissions produced by the vehicle along the route segment (or reducing wheel and track wear).

Subsequent to creating the mission plan, it is determined whether the mission plan is correct to satisfy at least one mission objective of the vehicle. If it is determined that the mission plan is not correct to satisfy the at least one mission objective, the method further comprises updating the received data that was used to create the mission plan. The mission plan is then revised based on the updated received data, to satisfy the at least one mission objective. Subsequent to revising the mission plan, the method further comprises operating the powered system based on the revised mission plan.

Persons skilled in the art will recognize that an apparatus, such as a data processing system 300 (see FIG. 13) can execute the methods representative of the invention embodiments. The system 300 includes a processor 304, a read-only memory (ROM) 306, a random access memory (RAM) 308, an input port 310, an output port 312, a clock 314, a data bus 320, and an address bus 322. The latter two components providing interconnects as illustrated. The system 300 can be programmed or otherwise designed to execute methods representative of the invention embodiments. Such a system includes appropriate program features for executing these methods.

The input port 310 receives the location information and the track characterization information, both described elsewhere herein, from appropriate devices on-board and off-board the locomotive. Control signals are supplied from the output port 312 for controlling the locomotive as herein described.

Also, an article of manufacture, such as a pre-recorded disk or other similar computer program product, for use with the data processing system 300, could include a storage medium and a program stored thereon for directing the data processing system 300 to execute the program product and control the locomotive. Such apparatuses and articles of manufacture also fall within the spirit and scope of the invention.

To facilitate an understanding of this embodiment of the invention, it is described with reference to specific implementations thereof. The invention is described in the general context of computer-executable instructions, such as program modules executed by a computer. Generally, program modules include routines, programs, objects, components, data structures, etc. that perform particular tasks or implement particular abstract data types. For example, the software programs that underlie the invention can be coded in different languages, for use with different platforms. It will be appreciated that the principles that underlie these embodiments of the invention can be implemented with other types of computer software technologies.

Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by processing devices that are linked through a communications network. In a distributed computing environment, program modules may be located in both local and remote computer storage media including memory storage devices. These local and remote computing environments may be contained entirely within one locomotive, or adjacent locomotives in a consist, or off-board in wayside or central offices where wireless communication provides connectivity between the local and remote computing environments.

Figure 13:
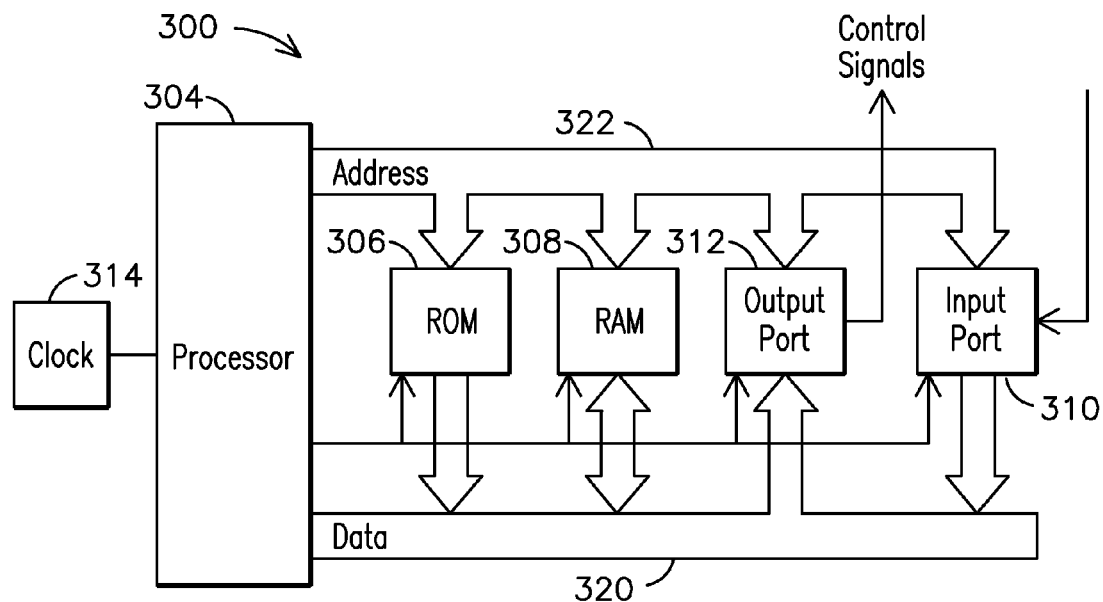
FIG. 13 depicts a data processing system for practicing the embodiments of the invention.
Figure 14:
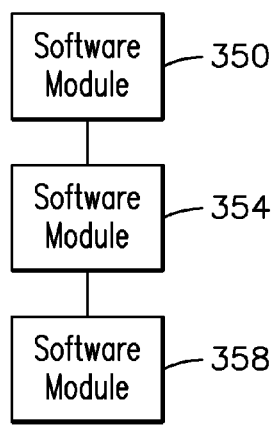
FIG. 14 depicts software modules for executing by the data processing system of FIG. 13.

FIG. 14 illustrates software modules that are input to and executed by the data processing system 300 of FIG. 13 for controlling the locomotive of a railroad train according to the various embodiments of the invention. A software module 350 determines a location of the train on the track segment. As described elsewhere herein, in one implementation that software module 350 comprises code/programming for controlling the processing system 300 to obtain location information from a GPS device. A software module 354 acquires track characterization information for a current or upcoming track segment. The track characterization information, as described further herein, is supplied from sources external to the data processing system 300 through the input port 310 (such as from a solid state drive or a hard disk drive for storing the track characterization information. A software module 358 controls the applied tractive forces and braking forces, responsive to the location of the train and the track characterization information, via the output port 312. The software modules 350, 354 and 358 are linked together as illustrated for execution by the data processing system 300.

As should be appreciated, any description herein relating to a "trip plan" is also applicable to a "mission plan," since a trip plan is one species of a mission plan, i.e., a trip plan is a mission plan for a vehicle. The same is true for "trip" and "mission" generally, i.e., a trip is a particular species of a mission.

Elements for determining a location of the train on the segment of track include, but are not limited to: GPS (global positioning system) equipment, wayside equipment producing a location-indicating signal received by a receiver on the train, a determined time and speed from a known starting location, distance traveled from a known starting location, still picture or video-based determinations, track mileposts read by a camera or by the locomotive operator, and an RF AEI tag.

Track characterization-determining elements include, but are not limited to: wayside equipment producing a signal representing track characterization information for receiving by a receiver on the train, a video camera or a still camera mounted on the train, information loaded to a memory before the trip begins, sensors mounted on the train, observations of the train operator, and updates of an onboard memory with track characterization information obtained by a previous train that traversed the same segment of track.

Generally, the track characterization information comprises any information related to the track physical characteristics such as, but not limited to, effective track grade, actual track grade, superelevation, track elevation, location of track curves, degree of curvature, curve length, curve radius, location of track switches, degree of divergence of the two rails at a track switch, track friction and wheel friction (e.g., slippery, wet, icy, dry), track stability relative to movement of track ballast, track warping, track humping, track altitude, track age, rail type and rail hardness, allowed speed, current weather conditions, coefficient of friction between the rail and the train wheels, track damage, wheel dimensions, track dimensions, and the location of these various physical characteristics on the track segment.

As known by those skilled in the art, there are numerous train conditions and characteristics that can be considered in developing the trip plan, and as explained elsewhere herein, certain of these conditions and characteristics will have a greater affect on the wheel and track wear and others will have a lesser affect on the wheel and track wear. The train conditions and characteristics include one or more of the following: number of cars in the train, weight of each railcar, total train weight, distribution of the train weight, wheel bearing temperature, a wheel profile, number of axles in the train, wheel rim width, wheel flange height, wheel flange width, locomotive consist composition, train load and train drag.

As generally described by those skilled in the art, wheel wear and track wear refer to dimensional changes in features of the wheel and/or the track as the wheel and/or the track wears. The nature of these dimensional changes, both direction and magnitude, are dependent on the contact surfaces between the wheel and the track and the amount of force exerted on those surfaces. For example, as a train rounds a curve large forces are exerted on the outside surface of the outer curved rail and the inside surface of the inner curved rail. These forces, which are typically greater than exerted on a straight rail section, tend to wear away the metal on both the wheel and the rail at that interface. The loss of this metal material changes (i.e., reduces) the dimensions of both the wheel and the rail along the surfaces in contact.

As used herein, unless otherwise specified, the term "railroad train" refers to any rail vehicle, meaning a vehicle or series of linked vehicles that travels along a track (e.g., a set of one or more rails or other vehicle guides).

While the invention has been described with reference to an exemplary embodiments, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A system comprising:
   a first element for determining a location of a train on a segment of track;
   a second element for providing track characterization information for the segment of track, the track characterization information related to physical conditions of the segment of track; and
   one or more processors for determining a trip plan based on the location of the train, the track characterization information, and one or more of a calculated amount of wear of a wheel of the train or a calculated amount of wear of the track caused by travel of the train over the track, wherein the train is at least one of automatically controlled according to the trip plan or is manually controlled by a train operator according to the trip plan.

2. The system of claim 1 wherein the one or more processors are configured to develop an updated trip plan responsive to updated track characterization information supplied to the second element during traversal of the train over the segment of track.

3. The system of claim 1 wherein the one or more processors are configured to determine in-train forces based on the trip plan and to develop an updated trip plan responsive to determining the in-train forces and based on the location of the train, the track characterization information, and the one or more of the calculated amount of wear of the wheel of the train or the calculated amount of wear of the track caused by travel of the train over the track.

4. The system of claim 1 wherein the one or more processors are configured to determine the trip plan such that a cant deficiency parameter representative of actual wear of the track is about zero.

5. The system of claim 1, wherein the track characterization information represents identification of a wheel slip in the segment of track for a previous train traveling over the segment of track.

6. The system of claim 1, wherein the track characterization information includes a weather condition at the segment of track.

7. The system of claim 1, wherein the second element is configured to determine a grade of the segment of track as the track characterization information, the grade determined from tractive power and acceleration used to travel over the segment of track.

8. The system of claim 1, wherein the track characterization information includes at least one of a curve length, a curve radius, or an amount of divergence at a track switch within the segment of track.

9. The system of claim 1, wherein the track characterization information includes at least one of track friction, friction of the wheel, track stability, track warping, track humping, track age, track type, track hardness, or a coefficient of friction between the wheel of the train and the track within the segment of track.

10. The system of claim 1, wherein the track characterization information includes a dimension of the wheel of the train.

11. The system of claim 1, wherein the one or more processors are configured to determine the one or more of the calculated amount of wear of the wheel of the train or the calculated amount of wear of the track based on a calculated rate of wear of one or more of the wheel or the track, the calculated rate of wear determined from one or more of a lateral force exerted on the track by the train, a lateral force exerted on the track by the train, a radius of curvature of the track, a gauge of the track, a cant of the track relative to the radius of curvature of the track, a profile of a portion of the track that contacts the wheel of the train, a geometry of the wheel, or a number of axles of the train.

12. The system of claim 1, wherein the one or more processors are configured to determine the trip plan as designating speed of the train as a function of one or more of distance or time, the one or more processors configured to determine the trip plan to reduce the one or more of the calculated amount of wear of the wheel or the calculated amount of wear of the track relative to the train traveling over the segment of the track according to one or more of speed or power settings that differ from the trip plan, and
   wherein the one or more processors are configured to calculate the one or more of the calculated amount of wear of the wheel of the train or the calculated amount of wear of the track from a difference between a super-elevation of the segment of the track and a ratio of a gauge of the segment of the track to one or more of a radius of curvature of the segment of the track, the speed of the train as designated by the trip plan, or gravitational acceleration.

13. A method comprising:
   determining a location of a vehicle on a segment of a route;
   obtaining route characterization information for the segment of the route, the route characterization information related to a physical condition of the segment of the route; and
   creating a trip plan for the vehicle based on the location of the vehicle, the route characterization information, and one or more of a rate of wear of a wheel of the vehicle or a rate of wear of the route, wherein the trip plan is created to be used to automatically control operations of the vehicle or to instruct an operator to manually control the operations of the vehicle according to the trip plan.

14. The method of claim 13, further comprising revising the trip plan into an updated trip plan responsive to updated track characterization information being received either during traversal of the vehicle over the segment of the route.

15. The method of claim 13, further comprising determining in-vehicle forces based on the trip plan and revising the trip plan into an updated trip plan responsive thereto and further responsive to the location of the vehicle, the route characterization information, and the one or more of the rate of wear of the wheel or the rate of wear of the route.

16. The method of claim 13, wherein the trip plan is created such that a cant deficiency parameter representative of actual wear of the track is about zero.

17. The method of claim 13, wherein the route characterization information represents identification of a wheel slip in the segment of the route for a previous vehicle traveling over the segment of the route.

18. The method of claim 13, wherein the route characterization information represents a weather condition at the segment of the route.

19. The method of claim 13, further comprising determining a grade of the segment of the route as the route characterization information, the grade determined from tractive power and acceleration used to travel over the segment of the route.

20. The method of claim 13, wherein the route characterization information includes at least one of a curve length, a curve radius, or an amount of divergence at a switch within the segment of the route.

21. The method of claim 13, wherein the route characterization information includes at least one of route friction, friction of the wheel, route stability, route warping, route humping, route age, route type, route hardness, or a coefficient of friction between the wheel of the vehicle and the route within the segment of the route.

22. The method of claim 13, wherein the route characterization information includes a dimension of the wheel of the vehicle.

23. A system comprising:
a location determining element configured to identify a location of a vehicle on a route;
a route characterization element configured to obtain route characterization information that is representative of one or more physical conditions of the route; and
one or more processors configured to determine a trip plan based on the location of the vehicle on the route, the route characterization information, and one or more of a rate of wear of a wheel of the vehicle or a rate of wear of the route, the one or more processors configured to determine the trip plan so that the trip plan can be used to one or more of automatically control operations of the vehicle or to direct manual control of the operations of the vehicle by an operator according to the trip plan, wherein the trip plan designates operational settings of the vehicle as a function of at least one of distance or time along the route.

24. The system of claim 23, wherein one or more processors are configured to develop an updated trip plan responsive to updated track characterization information being obtained by the route characterization element during or prior to traversal of the vehicle over the route.

25. The system of claim 23, wherein the one or more processors are configured to determine an in-vehicle force based on the trip plan and to develop an updated trip plan responsive to the in-vehicle forces, the location of the vehicle, the route characterization information, and the one or more of the rate of wear of the wheel or the rate of wear of the route.

26. The system of claim 23, wherein the track characterization information represents identification of a wheel slip in a segment of the route for a previous trip of the vehicle or another vehicle over the segment of the route.

27. The system of claim 26, wherein the one or more processors are configured to determine or modify the trip plan within the segment of the route based on the identification of the wheel slip in the previous trip.

28. The system of claim 23, wherein the track characterization information represents a weather condition in a segment of the route.

29. The system of claim 23, wherein the route characterization element is configured to determine a grade of a segment of the route as the route characterization information, the grade determined from tractive power and acceleration used by the vehicle or another vehicle during travel over the segment of the route during a previous trip.

30. The system of claim 23, wherein the route characterization information includes at least one of a curve length, a curve radius, or an amount of divergence at a switch within a segment of the route.

31. The system of claim 23, wherein the route characterization information includes at least one of route friction, friction of the wheel, route stability, route warping, route humping, route age, route type, route hardness, or a coefficient of friction between the wheel of the vehicle and the route within a segment of the route.

32. The system of claim 23, wherein the route characterization information includes a dimension of the wheel of the vehicle.

* * * * *